US011726632B2

(12) United States Patent
Nayak et al.

(10) Patent No.: US 11,726,632 B2
(45) Date of Patent: Aug. 15, 2023

(54) BUILDING MANAGEMENT SYSTEM WITH GLOBAL RULE LIBRARY AND CROWDSOURCING FRAMEWORK

(71) Applicant: Johnson Controls Technology Company, Milwaukee, WI (US)

(72) Inventors: Rajesh C. Nayak, Manipal (IN); Subrata Bhattacharya, Mumbai (IN); Abhigyan Chatterjee, Asansol (IN); Samit Sen, Kellyville (AU); Tulshiram Vitthalrao Waghmare, Pune (IN); Braja Behari Mitra Majumdar, Hooghly (IN)

(73) Assignee: JOHNSON CONTROLS TECHNOLOGY COMPANY, Auburn Hills, MI (US)

( * ) Notice: Subject to any disclaimer, the term of this patent is extended or adjusted under 35 U.S.C. 154(b) by 966 days.

(21) Appl. No.: 15/821,142

(22) Filed: Nov. 22, 2017

(65) Prior Publication Data
US 2019/0032948 A1 Jan. 31, 2019

(30) Foreign Application Priority Data
Jul. 27, 2017 (IN) .............................. 201741026688

(51) Int. Cl.
*G06F 3/0482* (2013.01)
*F24F 11/65* (2018.01)
(Continued)

(52) U.S. Cl.
CPC ............ *G06F 3/0482* (2013.01); *F24F 11/52* (2018.01); *F24F 11/65* (2018.01); *G06F 3/0481* (2013.01);
(Continued)

(58) Field of Classification Search
CPC .. F24F 11/65; F24F 11/52; F24F 11/64; F24F 11/56; F24F 2120/20; G01D 7/005;
(Continued)

(56) References Cited

U.S. PATENT DOCUMENTS

| 5,301,109 A | 4/1994 | Landauer et al. |
| 5,392,768 A | 2/1995 | Johansson et al. |

(Continued)

FOREIGN PATENT DOCUMENTS

| CN | 101415011 A | 4/2009 |
| CN | 102136099 A | 7/2011 |

(Continued)

OTHER PUBLICATIONS

Wikipedia.com, Synchronization (Computer Science). (Year: 2021).*
(Continued)

*Primary Examiner* — Michael Won
(74) *Attorney, Agent, or Firm* — Foley & Lardner LLP

(57) ABSTRACT

A building management system includes a remote rules server and a local rules server. The local rules server is located at a customer site, and includes a standard rules database and a custom rules database. The standard rules database stores standard rules and the custom rules database stores user-created rules. The local rules server is configured to allow a customer to create a new user-created rule and send the new user-created rule to the remote rules server. The remote rules server is configured to receive the new user-created rule and provide the new user-created rule to one or more other local rules servers located at one or more other customer sites.

17 Claims, 30 Drawing Sheets

(51) Int. Cl.
- *F24F 11/52* (2018.01)
- *G06F 3/04842* (2022.01)
- *G06F 3/04847* (2022.01)
- *G06T 11/20* (2006.01)
- *G06F 3/0481* (2022.01)
- *H04L 41/06* (2022.01)
- *G05B 23/02* (2006.01)
- *G06T 11/00* (2006.01)
- *G06F 3/04817* (2022.01)
- *G06Q 50/06* (2012.01)

(52) U.S. Cl.
CPC ...... *G06F 3/04842* (2013.01); *G06F 3/04847* (2013.01); *G06T 11/206* (2013.01); *H04L 41/06* (2013.01); *G05B 23/0216* (2013.01); *G05B 2219/2614* (2013.01); *G05B 2219/2642* (2013.01); *G06F 3/04817* (2013.01); *G06Q 50/06* (2013.01); *G06T 11/001* (2013.01)

(58) Field of Classification Search
CPC ... G01D 5/00; G06F 11/3013; G06F 11/3409; G06F 3/04842; G06F 3/04847; G06F 3/0481; G06F 3/04817; G06F 3/0482; H04L 41/06; H04L 41/22; H04L 67/12; H04L 67/125; G06T 3/40; G06T 11/001; G06T 11/206; G06T 2200/24; G05B 15/02; G05B 19/0426; G05B 2219/2614; G05B 2219/2642; G05B 23/0216; G05B 19/418; G06Q 50/06

See application file for complete search history.

(56) References Cited

U.S. PATENT DOCUMENTS

| | | | |
|---|---|---|---|
| 5,446,677 | A | 8/1995 | Jensen et al. |
| 5,450,336 | A | 9/1995 | Rubsamen et al. |
| 5,581,478 | A | 12/1996 | Cruse et al. |
| 5,812,962 | A | 9/1998 | Kovac |
| 5,960,381 | A | 9/1999 | Singers et al. |
| 5,973,662 | A | 10/1999 | Singers et al. |
| 6,014,612 | A | 1/2000 | Larson et al. |
| 6,031,547 | A | 2/2000 | Kennedy |
| 6,134,511 | A | 10/2000 | Subbarao |
| 6,157,943 | A | 12/2000 | Meyer |
| 6,285,966 | B1 | 9/2001 | Brown et al. |
| 6,363,422 | B1 | 3/2002 | Hunter et al. |
| 6,385,510 | B1 | 5/2002 | Hoog et al. |
| 6,389,331 | B1 | 5/2002 | Jensen et al. |
| 6,401,027 | B1 | 6/2002 | Xu et al. |
| 6,437,691 | B1 | 8/2002 | Sandelman et al. |
| 6,477,518 | B1 | 11/2002 | Li et al. |
| 6,487,457 | B1 | 11/2002 | Hull et al. |
| 6,493,755 | B1 | 12/2002 | Hansen et al. |
| 6,577,323 | B1 | 6/2003 | Jamieson et al. |
| 6,626,366 | B2 | 9/2003 | Kayahara et al. |
| 6,646,660 | B1 | 11/2003 | Patty |
| 6,704,016 | B1 | 3/2004 | Oliver et al. |
| 6,732,540 | B2 | 5/2004 | Sugihara et al. |
| 6,764,019 | B1 | 7/2004 | Kayahara et al. |
| 6,782,385 | B2 | 8/2004 | Natsumeda et al. |
| 6,813,532 | B2 | 11/2004 | Eryurek et al. |
| 6,816,811 | B2 | 11/2004 | Seem |
| 6,823,680 | B2 | 11/2004 | Jayanth |
| 6,826,454 | B2 | 11/2004 | Sulfstede |
| 6,865,511 | B2 | 3/2005 | Frerichs et al. |
| 6,925,338 | B2 | 8/2005 | Eryurek et al. |
| 6,986,138 | B1 | 1/2006 | Sakaguchi et al. |
| 7,031,880 | B1 | 4/2006 | Seem et al. |
| 7,401,057 | B2 | 7/2008 | Eder |
| 7,475,235 | B1 | 1/2009 | Bernardy et al. |
| 7,552,467 | B2 | 6/2009 | Lindsay |
| 7,627,544 | B2 | 12/2009 | Chkodrov et al. |
| 7,818,249 | B2 | 10/2010 | Lovejoy et al. |
| 7,877,781 | B2 * | 1/2011 | Lim ............... H04L 63/20 726/1 |
| 7,889,051 | B1 | 2/2011 | Billig et al. |
| 7,996,488 | B1 | 8/2011 | Casabella et al. |
| 8,078,330 | B2 | 12/2011 | Brickfield et al. |
| 8,104,044 | B1 | 1/2012 | Scofield et al. |
| 8,229,470 | B1 | 7/2012 | Ranjan et al. |
| 8,396,740 | B1 | 3/2013 | Watson |
| 8,401,991 | B2 | 3/2013 | Wu et al. |
| 8,495,745 | B1 | 7/2013 | Schrecker et al. |
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | MacKay |
| 8,682,921 | B2 | 3/2014 | Park et al. |
| 8,731,724 | B2 | 5/2014 | Drees et al. |
| 8,737,334 | B2 | 5/2014 | Ahn et al. |
| 8,738,334 | B2 | 5/2014 | Jiang et al. |
| 8,751,487 | B2 | 6/2014 | Byrne et al. |
| 8,788,097 | B2 | 7/2014 | Drees et al. |
| 8,805,995 | B1 | 8/2014 | Oliver |
| 8,843,238 | B2 | 9/2014 | Wenzel et al. |
| 8,874,071 | B2 | 10/2014 | Sherman et al. |
| 8,941,465 | B2 | 1/2015 | Pineau et al. |
| 8,990,127 | B2 | 3/2015 | Taylor |
| 9,070,113 | B2 | 6/2015 | Shafiee et al. |
| 9,116,978 | B2 | 8/2015 | Park et al. |
| 9,185,095 | B1 | 11/2015 | Moritz et al. |
| 9,189,527 | B2 | 11/2015 | Park et al. |
| 9,196,009 | B2 | 11/2015 | Drees et al. |
| 9,229,966 | B2 | 1/2016 | Aymeloglu et al. |
| 9,286,582 | B2 | 3/2016 | Drees et al. |
| 9,311,807 | B2 | 4/2016 | Schultz et al. |
| 9,344,751 | B1 | 5/2016 | Ream et al. |
| 9,354,968 | B2 | 5/2016 | Wenzel et al. |
| 9,507,686 | B2 | 11/2016 | Horn et al. |
| 9,521,009 | B1 | 12/2016 | Skeffington |
| 9,524,594 | B2 | 12/2016 | Ouyang et al. |
| 9,558,196 | B2 | 1/2017 | Johnston et al. |
| 9,652,813 | B2 | 5/2017 | Gifford et al. |
| 9,703,276 | B2 | 7/2017 | Piaskowski et al. |
| 9,753,455 | B2 | 9/2017 | Drees |
| 9,811,249 | B2 | 11/2017 | Chen et al. |
| 9,825,467 | B2 | 11/2017 | Lee |
| 9,838,844 | B2 | 12/2017 | Emeis et al. |
| 9,886,478 | B2 | 2/2018 | Mukherjee |
| 9,948,359 | B2 | 4/2018 | Horton |
| 10,025,337 | B2 | 7/2018 | Hancock et al. |
| 10,055,114 | B2 | 8/2018 | Shah et al. |
| 10,055,206 | B2 | 8/2018 | Park et al. |
| 10,090,919 | B2 | 10/2018 | Harris |
| 10,101,050 | B2 | 10/2018 | Radovanovic et al. |
| 10,116,461 | B2 | 10/2018 | Fairweather et al. |
| 10,169,454 | B2 | 1/2019 | Ait-Mokhtar et al. |
| 10,171,586 | B2 | 1/2019 | Shaashua et al. |
| 10,187,258 | B2 | 1/2019 | Nagesh et al. |
| 10,250,039 | B2 | 4/2019 | Wenzel et al. |
| 10,253,997 | B2 | 4/2019 | Salsbury et al. |
| 10,278,048 | B2 | 4/2019 | Sharma et al. |
| 10,281,363 | B2 | 5/2019 | Vitullo et al. |
| 10,283,968 | B2 | 5/2019 | Elbsat et al. |
| 10,317,261 | B2 | 6/2019 | Noboa et al. |
| 10,317,863 | B2 | 6/2019 | Papadopoulos |
| 10,514,963 | B2 | 12/2019 | Shrivastava et al. |
| 10,515,098 | B2 | 12/2019 | Park et al. |
| 10,534,326 | B2 | 1/2020 | Sridharan et al. |
| 10,536,295 | B2 | 1/2020 | Fairweather et al. |
| 10,705,492 | B2 | 7/2020 | Harvey |
| 10,708,078 | B2 | 7/2020 | Harvey |
| 10,845,771 | B2 | 11/2020 | Harvey |
| 10,854,194 | B2 | 12/2020 | Park et al. |
| 10,862,928 | B1 | 12/2020 | Badawy et al. |
| 10,921,760 | B2 | 2/2021 | Harvey |
| 10,921,972 | B2 | 2/2021 | Park et al. |
| 10,969,133 | B2 | 4/2021 | Harvey |
| 10,986,121 | B2 | 4/2021 | Stockdale et al. |
| 11,016,998 | B2 | 5/2021 | Park et al. |

(56) References Cited

U.S. PATENT DOCUMENTS

| | | | |
|---|---|---|---|
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0088472 A1* | 5/2003 | Offutt | G06Q 20/203 |
| | | | 705/22 |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0098148 A1 | 5/2004 | Retlich et al. |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2004/0199925 A1 | 10/2004 | Nixon et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2005/0289467 A1 | 12/2005 | Imhof et al. |
| 2006/0010388 A1 | 1/2006 | Imhof et al. |
| 2006/0013281 A1 | 1/2006 | Sri-Jayantha et al. |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0208872 A1* | 9/2006 | Yu | G08B 25/08 |
| | | | 340/517 |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0100859 A1* | 5/2007 | Holmes | G06Q 10/06 |
| 2007/0180077 A1 | 8/2007 | Letca et al. |
| 2007/0203693 A1 | 8/2007 | Estes |
| 2007/0239351 A1 | 10/2007 | Sherrill et al. |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0040628 A1 | 2/2008 | Mandal |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0052677 A1 | 2/2009 | Smith |
| 2009/0063509 A1 | 3/2009 | Lockhart et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0179940 A1* | 7/2010 | Gilder | G06F 16/258 |
| | | | 707/622 |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0029102 A1 | 2/2011 | Campney et al. |
| 2011/0047230 A1 | 2/2011 | McGee |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | MacKay et al. |
| 2011/0087988 A1 | 4/2011 | Ray et al. |
| 2011/0088000 A1 | 4/2011 | MacKay |
| 2011/0125737 A1 | 5/2011 | Pothering et al. |
| 2011/0137853 A1 | 6/2011 | MacKay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0161124 A1 | 6/2011 | Lappinga et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2011/0264418 A1 | 10/2011 | Szewczyk et al. |
| 2012/0011126 A1 | 1/2012 | Park et al. |
| 2012/0011141 A1 | 1/2012 | Park et al. |
| 2012/0022698 A1 | 1/2012 | MacKay |
| 2012/0022700 A1 | 1/2012 | Drees et al. |
| 2012/0041569 A1 | 2/2012 | Zhang et al. |
| 2012/0053739 A1 | 3/2012 | Brian et al. |
| 2012/0053740 A1 | 3/2012 | Venkatakrishnan et al. |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0198253 A1 | 8/2012 | Kato et al. |
| 2012/0259583 A1 | 10/2012 | Noboa et al. |
| 2012/0262472 A1 | 10/2012 | Garr et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0054438 A1* | 2/2013 | Boding | G06Q 20/4016 |
| | | | 705/35 |
| 2013/0060820 A1 | 3/2013 | Bulusu et al. |
| 2013/0066477 A1 | 3/2013 | Jiang |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0151979 A1 | 6/2013 | Snider et al. |
| 2013/0167035 A1 | 6/2013 | Imes et al. |
| 2013/0170710 A1 | 7/2013 | Kuoch et al. |
| 2013/0198245 A1 | 8/2013 | Kagan et al. |
| 2013/0204836 A1 | 8/2013 | Choi et al. |
| 2013/0226853 A1 | 8/2013 | Beaulieu et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2014/0005809 A1* | 1/2014 | Frei | H04L 51/38 |
| | | | 700/90 |
| 2014/0032506 A1 | 1/2014 | Hoey et al. |
| 2014/0059483 A1 | 2/2014 | Mairs et al. |
| 2014/0075380 A1 | 3/2014 | Milirud et al. |
| 2014/0078151 A1 | 3/2014 | Garr et al. |
| 2014/0081652 A1 | 3/2014 | Klindworth |
| 2014/0135952 A1 | 5/2014 | Maehara |
| 2014/0143695 A1 | 5/2014 | Sundermeyer et al. |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0196131 A1 | 7/2014 | Lee |
| 2014/0207282 A1 | 7/2014 | Angle et al. |
| 2014/0207392 A1 | 7/2014 | Cornwall |
| 2014/0258052 A1 | 9/2014 | Khuti et al. |

(56) References Cited

U.S. PATENT DOCUMENTS

| | | |
|---|---|---|
| 2014/0269614 A1 | 9/2014 | Maguire et al. |
| 2014/0277754 A1 | 9/2014 | Miller |
| 2014/0277765 A1 | 9/2014 | Karimi et al. |
| 2014/0278165 A1 | 9/2014 | Wenzel et al. |
| 2014/0278461 A1 | 9/2014 | Artz |
| 2014/0278512 A1* | 9/2014 | Young .................. G06Q 10/10 705/2 |
| 2014/0310417 A1 | 10/2014 | Sorenson et al. |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0067150 A1* | 3/2015 | Heredia ................ H04L 67/141 709/224 |
| 2015/0088312 A1 | 3/2015 | Lo et al. |
| 2015/0105917 A1 | 4/2015 | Sasaki et al. |
| 2015/0127175 A1 | 5/2015 | Garr et al. |
| 2015/0145468 A1 | 5/2015 | Ma et al. |
| 2015/0156031 A1 | 6/2015 | Fadell et al. |
| 2015/0167661 A1* | 6/2015 | Garvey ................ F04B 51/00 702/183 |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0178865 A1 | 6/2015 | Anderson et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0212714 A1 | 7/2015 | Hua et al. |
| 2015/0227870 A1 | 8/2015 | Noboa et al. |
| 2015/0235267 A1 | 8/2015 | Steube et al. |
| 2015/0236934 A1 | 8/2015 | Huang et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0293508 A1 | 10/2015 | Piaskowski et al. |
| 2015/0295796 A1 | 10/2015 | Hsiao et al. |
| 2015/0301121 A1 | 10/2015 | Park |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0362240 A1 | 12/2015 | Sibik |
| 2015/0379037 A1* | 12/2015 | Pimprikar ............. G06F 16/178 707/610 |
| 2015/0379080 A1 | 12/2015 | Jochimski |
| 2016/0011753 A1 | 1/2016 | McFarland et al. |
| 2016/0014073 A1 | 1/2016 | Reddy et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0069584 A1 | 3/2016 | Holaso et al. |
| 2016/0070736 A1 | 3/2016 | Swan et al. |
| 2016/0070758 A1* | 3/2016 | Thomson ............. G06F 21/6245 707/781 |
| 2016/0078229 A1 | 3/2016 | Gong et al. |
| 2016/0090839 A1 | 3/2016 | Stolarczyk |
| 2016/0091217 A1 | 3/2016 | Verberkt et al. |
| 2016/0095188 A1 | 3/2016 | Verberkt et al. |
| 2016/0103838 A1 | 4/2016 | Sainani et al. |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0210569 A1 | 7/2016 | Enck |
| 2016/0212165 A1 | 7/2016 | Singla et al. |
| 2016/0212506 A1 | 7/2016 | Norwood et al. |
| 2016/0239660 A1 | 8/2016 | Azvine et al. |
| 2016/0239756 A1 | 8/2016 | Aggour et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0322817 A1 | 11/2016 | Baker et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0019487 A1 | 1/2017 | Maheshwari et al. |
| 2017/0027045 A1 | 1/2017 | Chemel |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0122773 A1 | 5/2017 | Ho et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0234067 A1 | 8/2017 | Fasi et al. |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0271984 A1 | 9/2017 | Kohn et al. |
| 2017/0277769 A1 | 9/2017 | Pasupathy et al. |
| 2017/0277816 A1 | 9/2017 | Chen |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0033025 A1 | 2/2018 | Sun et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0074530 A1 | 3/2018 | Garr et al. |
| 2018/0114140 A1 | 4/2018 | Chen et al. |
| 2018/0137227 A1 | 5/2018 | Ishii et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0165772 A1 | 6/2018 | Crawford et al. |
| 2018/0167260 A1 | 6/2018 | Velipasaoglu et al. |

(56) References Cited

U.S. PATENT DOCUMENTS

| | | |
|---|---|---|
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0238943 A1 | 8/2018 | Bernsee et al. |
| 2018/0239982 A1 | 8/2018 | Rutschman et al. |
| 2018/0246150 A1 | 8/2018 | Cook |
| 2018/0252423 A1 | 9/2018 | Hieke et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0293038 A1 | 10/2018 | Meruva et al. |
| 2018/0293504 A1 | 10/2018 | Meruva et al. |
| 2018/0336785 A1 | 11/2018 | Ghannam et al. |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0036975 A1* | 1/2019 | Beckman ............ H04L 63/0428 |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0089193 A1 | 3/2019 | Ranjan et al. |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0138512 A1 | 5/2019 | Pourmohammad et al. |
| 2019/0141798 A1 | 5/2019 | Cheng et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0268178 A1 | 8/2019 | Fairweather et al. |
| 2019/0310979 A1 | 10/2019 | Masuzaki et al. |
| 2020/0226156 A1 | 7/2020 | Borra et al. |
| 2020/0285203 A1 | 9/2020 | Thakur et al. |
| 2021/0042299 A1 | 2/2021 | Migliori |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0138684 A1 | 5/2022 | Harvey |
| 2022/0215264 A1 | 7/2022 | Harvey et al. |
| 2023/0010757 A1 | 1/2023 | Preciado |

FOREIGN PATENT DOCUMENTS

| | | |
|---|---|---|
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 105183917 | 12/2015 |
| CN | 105683942 | 6/2016 |
| CN | 106204392 A | 12/2016 |
| CN | 106406806 A | 2/2017 |
| CN | 106598988 | 4/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | PCT/US2017/035524 | 6/2017 |
| WO | WO-2017/127373 | 7/2017 |
| WO | PCT/US2017/052060 | 9/2017 |
| WO | PCT/US2017/052633 | 9/2017 |
| WO | PCT/US2017/052829 | 9/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

OTHER PUBLICATIONS

U.S. Appl. No. 15/182,579, filed Jun. 4, 2016, Johnson Controls Technology Company.
U.S. Appl. No. 15/182,580, filed Jun. 14, 2016, Johnson Controls Technology Company.
U.S. Appl. No. 15/408,404, filed Jan. 17, 2017, Johnson Controls Technology Company.
U.S. Appl. No. 15/644,519, filed Jul. 7, 2017, Johnson Controls Technology Company.
U.S. Appl. No. 15/644,560, filed Jul. 7, 2017, Johnson Controls Technology Company.
U.S. Appl. No. 15/644,581, filed Jul. 7, 2017, Johnson Controls Technology Company.
Jensen, AM; Belew, ST. Monitoring Building Systems for Schedule Compliance. US Department of Energy. Feb. 2013, 12 pages.
Piloting a New Paradigm for Continuous Commissioning of Chiller Plan. Building and Construction Authority. Jan. 3, 2016, 4 Pages.
Project Resourcing Time Management Implications. 2017, 1 Page.
Office Action on CN 201810414452.2, dated Sep. 8, 2021, 19 pages with English language translation.
ESCI—Knowledge Sharing Platform, "Piloting a New Paradigm for Continuous Commissioning of Chiller Plant," URL: https://www.esci-ksp.org/archives/project/piloting-a-new-paradigm-for-continuous-commissioning-of-chi11er-plant-2?task_i d=604posted Nov. 3, 2016, last modified Jan. 26, 2017, 7 pages.
Jensen et al., "Monitoring Building Systems for Schedule Compliance," Pacific Northwest National Laboratory for U.S. DOE, Feb. 2013, 12 pages.
Office Action on CN 201810414452.2, dated Mar. 10, 2021, 10 pages.
Balaji et al., "Brick: Metadata schema for portable smart building applications," Applied Energy, 2018 (20 pages).
Balaji et al., "Brick: Metadata schema for portable smart building applications," Applied Energy, Sep. 15, 2018, 3 pages, (Abstract).
Balaji et al., "Demo Abstract: Portable Queries Using the Brick Schema for Building Applications," BuildSys '16, Palo Alto, CA, USA, Nov. 16-17, 2016 (2 pages).
Balaji, B et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).

(56) References Cited

OTHER PUBLICATIONS

Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Present ation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Jan. 11, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022(203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).

(56) References Cited

OTHER PUBLICATIONS

Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-US/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
Zhou, Q. et al., "Knowledge-infused and Consistent Complex Event Processing over Real-time and Persistent Streams," Further Generation Computer Systems, 2017, 76 (pp. 391-406).

\* cited by examiner

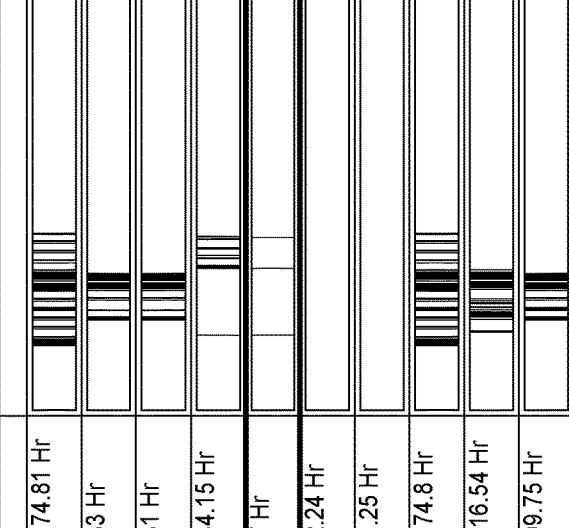
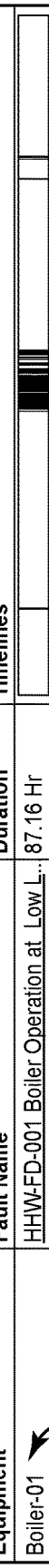
FIG. 31
FIG. 32

| | | | | |
|---|---|---|---|---|
| Space | Meter Configuration | Equipment Configuration — 3501 | Rules | Faults | Users | Schedule | Global points | Baseline | Auto Configuration | Work Order |

■ Required

Fault | Diagnostics | Reason | Energy FDD

| Fault List | Equipment category | Select equipment category ▼ | Equipment category | Select equipment category ▼ | Search fault 🔍 |
|---|---|---|---|---|---|

| Fault Name | RuleID | | | | | |
|---|---|---|---|---|---|---|
| ACB-FD-001 High Zone Dew point | 📄 | | | | | |
| AHU-FD-001 High Return Air humidity | 📄 | | | | | |
| AHU-FD-002 High Static Pressure | 📄 | | | | | |
| AHU-FD-003 High Supply Air Temperature in Cooling Mode | 📄 | | | | | |
| AHU-FD-004 Low Static Pressure | 📄 | | | | | |
| AHU-FD-005 Low Supply Air Temperature in Heating Mode | 📄 | | | | | |
| AHU-FD-006 Poor Indoor Air Quality | 📄 | | | | | |
| AHU-FD-007 Supply Air Flow Less Than Set Value | 📄 | | | | | |
| AHU-FD-008 Determine if Supply Air Humidity sensor is Faulty | 📄 | | | | | |
| AHU-FD-009 Determine if Supply Air Temperature sensor is Faulty | 📄 | | | | | |
| AHU-FD-010 After Hour Operation | 📄 | | | | | |
| AHU-FD-012 AHU Status and Command Mismatch | 📄 | | | | | |
| AHU-FD-013 Supply Air Flow Reading During Unit Off | 📄 | | | | | |
| AHU-FD-014 CHW/HHW valve open while fan inactive | 📄 | | | | | |

Page Size 50 ▼ |◀ ◀ 1 ▼ /2 ▶ ▶|          Total Items: 93

Fault asset mapping
Fault diagnostic mapping

FIG. 37

BUILDING MANAGEMENT SYSTEM WITH GLOBAL RULE LIBRARY AND CROWDSOURCING FRAMEWORK

CROSS-REFERENCE TO RELATED PATENT APPLICATION

This application claims the benefit of and priority to Indian Provisional Patent Application No. 201741026688 filed Jul. 27, 2017, the entire disclosure of which is incorporated by reference herein.

BACKGROUND

The present disclosure relates generally to a building management system (BMS) and more particularly to a BMS with enterprise management and reporting. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

SUMMARY

One implementation of the present disclosure is a building management system. The building management system includes a remote rules server and a local rules server. The local rules server is located at a customer site, and includes a standard rules database and a custom rules database. The standard rules database stores standard rules and the custom rules database stores user-created rules. The local rules server is configured to allow a customer to create a new user-created rule and send the new user-created rule to the remote rules server. The remote rules server is configured to receive the new user-created rule and provide the new user-created rule to one or more other local rules servers located at one or more other customer sites.

In some embodiments, the remote rules server is also configured to notify a reviewer that the new user-created rule was created, allow the reviewer to validate the new user-created rule and signal an approval, and authorize activation of the validated new user-created rule in response to the approval.

In some embodiments, the building management system also includes a user preferences module. The user preferences module may receive a customer sharing preference indicating a preference of the customer to share or not share user-created rules. If the customer has indicated a preference to not share user-created rules, the user preferences module may prevent the remote rules server from sending the user-created rule to the one or more other local rules servers and prevent the local rules server from receiving custom rules created by other customers.

In some embodiments, the building management system of claim 1 also includes a fault detection and diagnostics module configured to apply the standard rules and the custom rules to a building equipment dataset. The local rules server may also include an interface generator that generates a user interface. The user interface may allow a user to select which rules from the standard rules database and the custom rules database are applied by the fault detection and diagnostics module. In some embodiments, the rules include fault rules and diagnostic rules. The user interface may be configured to allow the user to map the diagnostic rules to the fault rules. In some embodiments, each rule is made up of at least a rule description and a rule equation. The user interface may be configured to display the rule description for each rule and hide the rule equation for user-created rules created by a different customer.

In some embodiments, the local rules server is also configured to allow a user to edit a user-created rule and send the edited user-created rule to the remote rules server. The remote rules server may be configured to receive the edited user-created rule and notify a reviewer that the edited user-created rule was edited. The remote rules server may further allow the reviewer to validate the edited user-created rule and send the edited user-created rule to the one or more other local rules servers.

Another implementation of the present disclosure is a method for managing a building. The method includes storing standard rules in a standard rules database and user-created rules in a custom rules database. The standard rules database and the custom rules database located in a local rules server. The method also includes allowing a customer to create a new user-created rule and sending the new user-created rule to a remote rules server. Receive the new user-created rule at the remote rules server and providing the new user-created rule to one or more other local rules servers located at one or more other customer sites.

In some embodiments, the method also includes notifying a reviewer that the new user-created rule was created and allowing the reviewer to validate the new user-created rule and provide an approval to the remote rules server. The method may also include activating the new user-created rule in response to the approval.

In some embodiments, the method may also include receiving a customer sharing preference indicating preference of the customer to share or not share user-created rules. If the customer has indicated a preference to not share user-created rules, the method may include preventing the remote rules server from sending the user-created rule to the one or more other local rules servers and preventing the local rules server from receiving custom rules created by other customers.

In some embodiments, the method also includes allowing a user to edit user-created rules at the local rules server and sending the edited user-created rule to the remote rules server. The remote rules server may receive the edited user-created rule and notify a reviewer that the edited user-created rule was edited. The method may also include allowing the reviewer to validate the edited user-created rule and sending the edited user-created rule to the local rules server and the additional local rules servers.

In some embodiments, the method also includes generating a user interface. The user interface may be configured to allow a user to select which rules from the standard rules database and the custom rules database are applied by a fault detection and diagnostics module. In some embodiments, the rules include fault rules and diagnostic rules. The user interface is also configured to allow the user to map the diagnostic rules to the fault rules. In some embodiments, each rule comprises a rule description and a rule equation. The user interface may be configured to display the rule description for each rule and hide the rule equation for user-created rules created by a different customer.

Another implementation of the present disclosure is a building management system. The building management system includes a global rules library and a plurality of local rules servers. The local rules servers are in communication with the global rules database. Each local rules server is configured to allow a user to create a user-created rule, send the user-created rule to a reviewer for validation, receive confirmation of rule validation, and upload the validated user-created rule to the global rules database.

In some embodiments, the global rules database includes a standard rules database that stores standard rules and a custom rules library that stores user-created rules. Each local rules server may be further configured to access the standard rules database and the custom rules database to provide a list of standard rules and a list of user-created rules on a user interface. The user interface may be configured to allow a user to select rules from the list of standard rules and the list of user-created rules to be applied to a building equipment dataset.

In some embodiments, the building management system also includes a user preferences module that provides the terms of conditions of the building management system and provides an option to opt-in or opt-out of sharing user-created rules.

In some embodiments, each rule comprises a rule description and a rule equation. The user interface may be configured to display the rule description for each rule and hide the rule equation for user-created rules created by a different customer. In some embodiments, the rules include fault rules and diagnostic rules. The user interface is also configured to allow the user to map the diagnostic rules to the fault rules.

In some embodiments, each local rules server may also be configured to allow a user to edit a user-created rule created using the local rules server, send the edited user-created rule to a reviewer for validation, receive a confirmation of rule validation, and send the edited user-created rule to the global rules database. The global rule library may be configured to replace the user-created rule with the edited user-created rule in the custom rules database.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 31 is a drawing of a fault visualization interface for an air handling unit (AHU), according to some embodiments.

FIG. 32 is a drawing of a fault visualization interface for a boiler, according to some embodiments.

FIG. 35 is a drawing of a user interface listing a set of global fault rules, according to some embodiments.

FIG. 37 is a drawing of a rule editor which can be used to define a custom fault rule, according to some embodiments.

DETAILED DESCRIPTION

Building HVAC Systems and Building Management Systems

Figure 1:
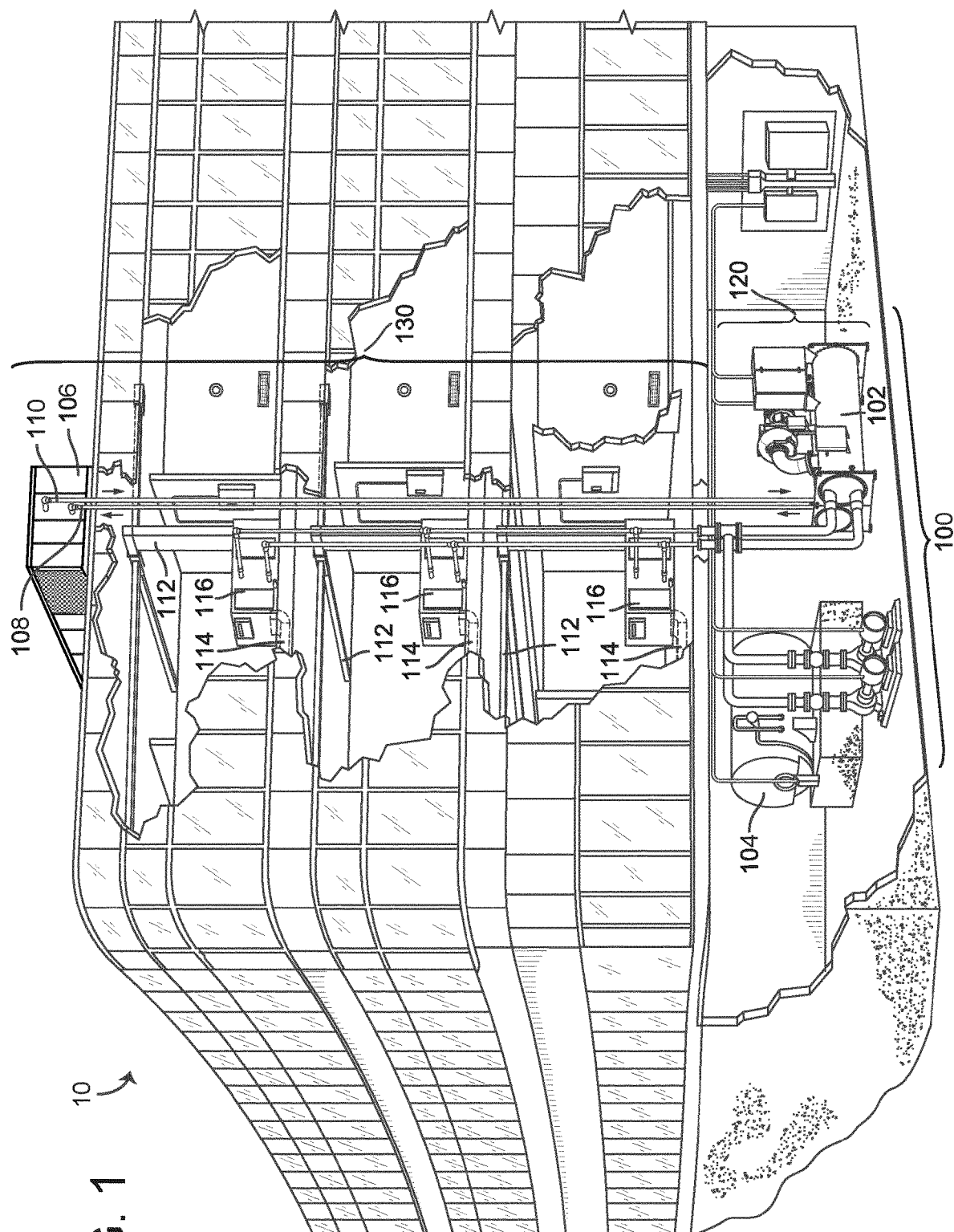
FIG. 1 is a drawing of a building equipped with a HVAC system, according to some embodiments.
Figure 2:
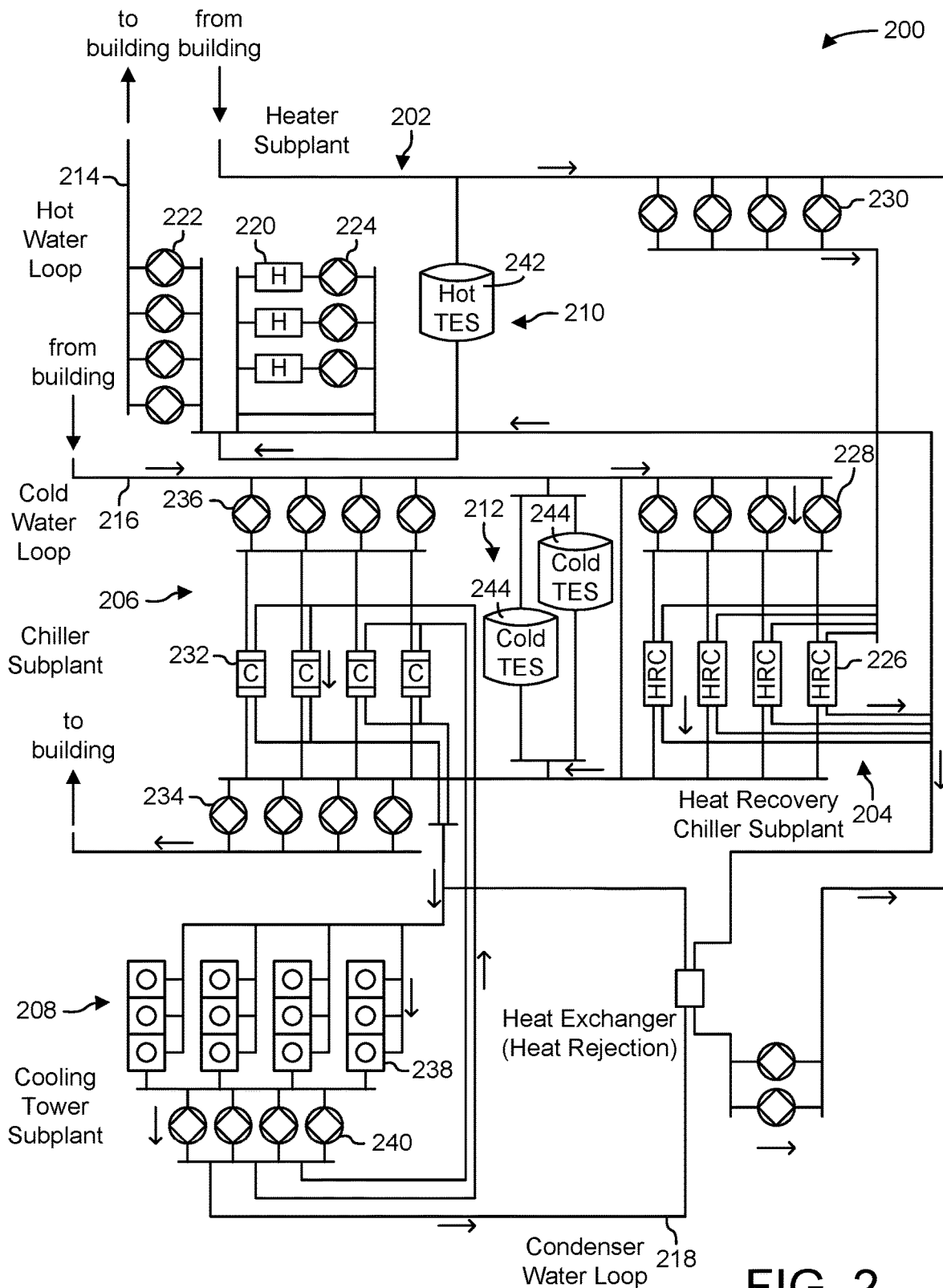
FIG. 2 is a block diagram of a waterside system which can be used to serve the building of FIG. 1, according to some embodiments.
Figure 3:
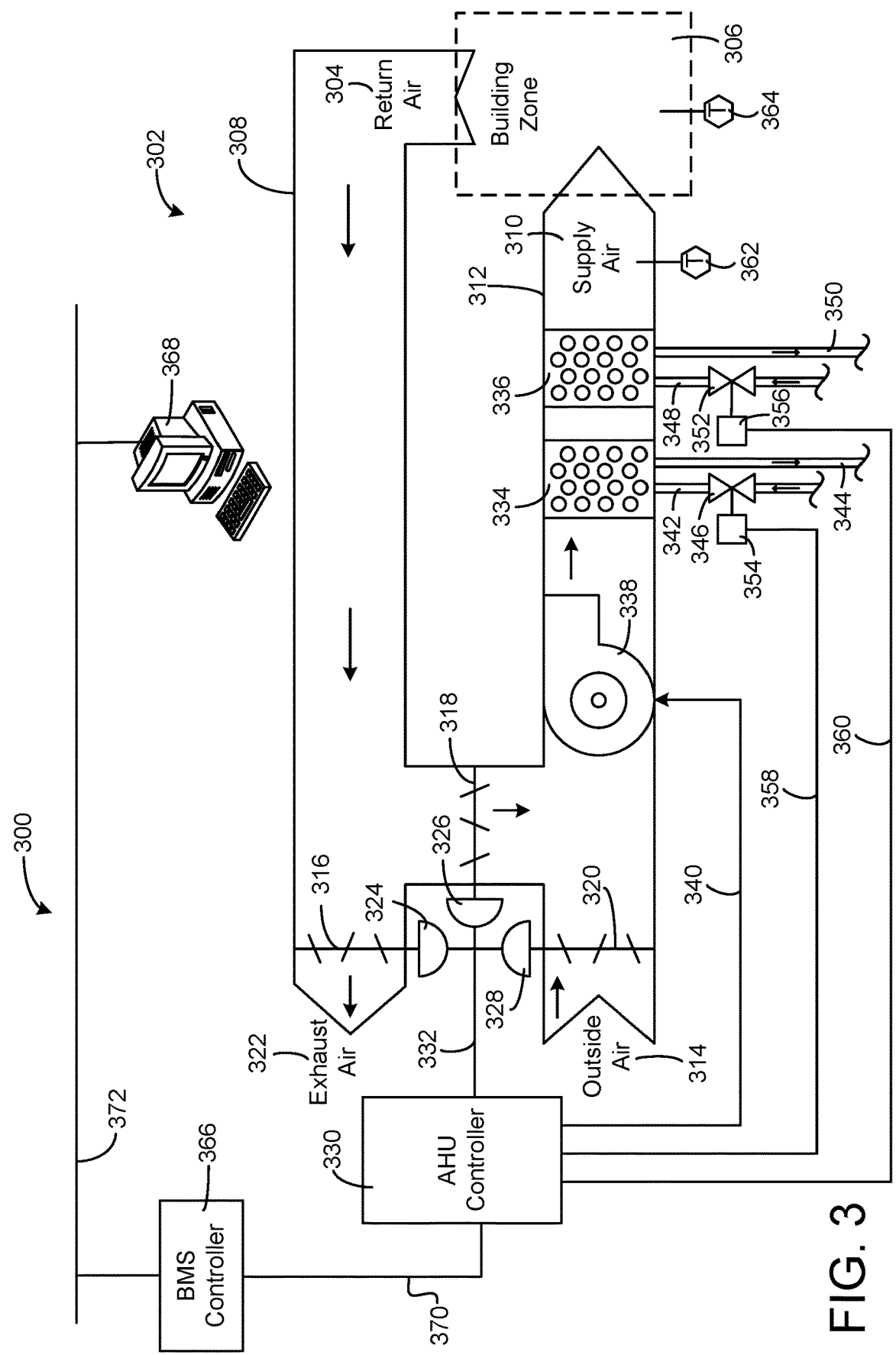
FIG. 3 is a block diagram of an airside system which can be used to serve the building of FIG. 1, according to some embodiments.
Figure 4:
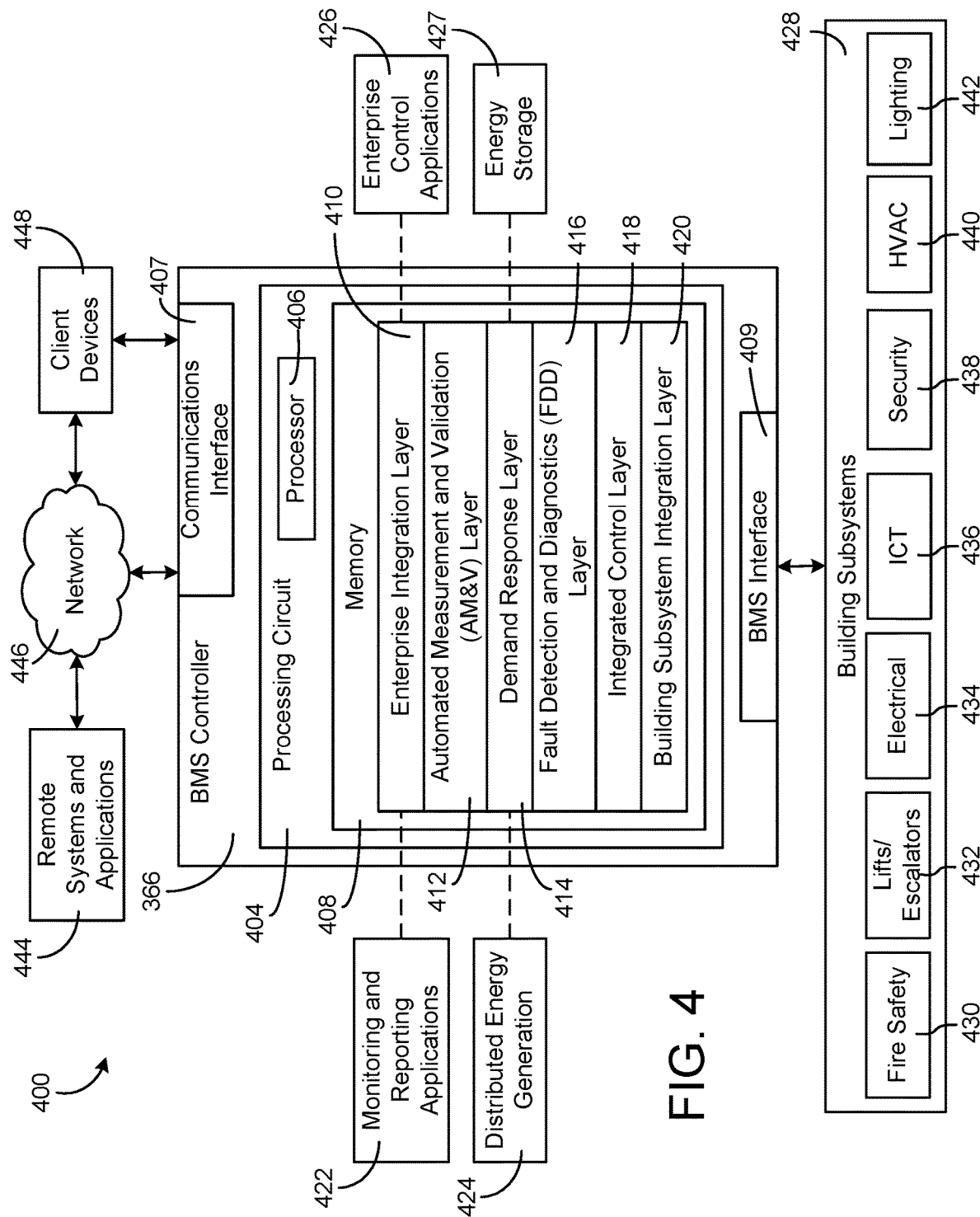
FIG. 4 is a block diagram of a building management system (BMS) which can be used to monitor and control the building of FIG. 1, according to some embodiments.
Figure 5:
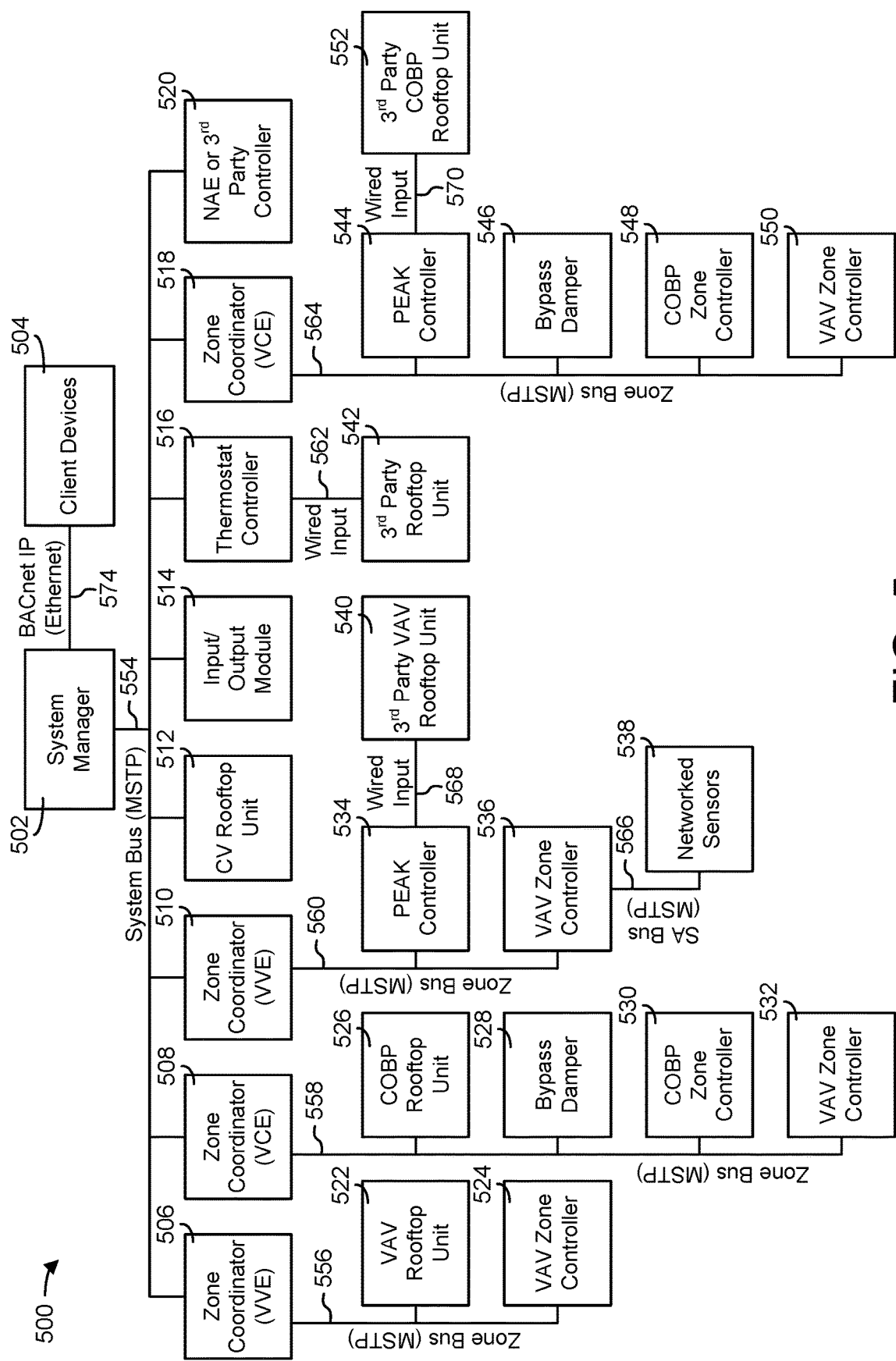
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100.

When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (TOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Figure 6:
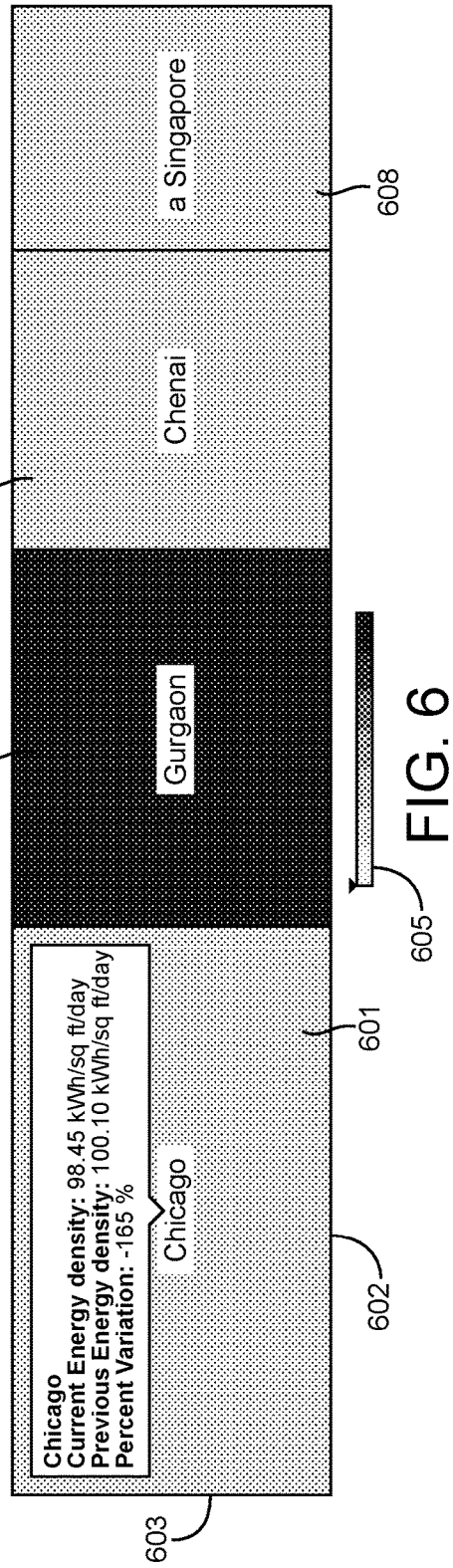
FIG. 6 is a drawing of a building energy performance report generated by performing a three-dimensional analysis comparing building energy consumption, according to some embodiments.
Figure 7:
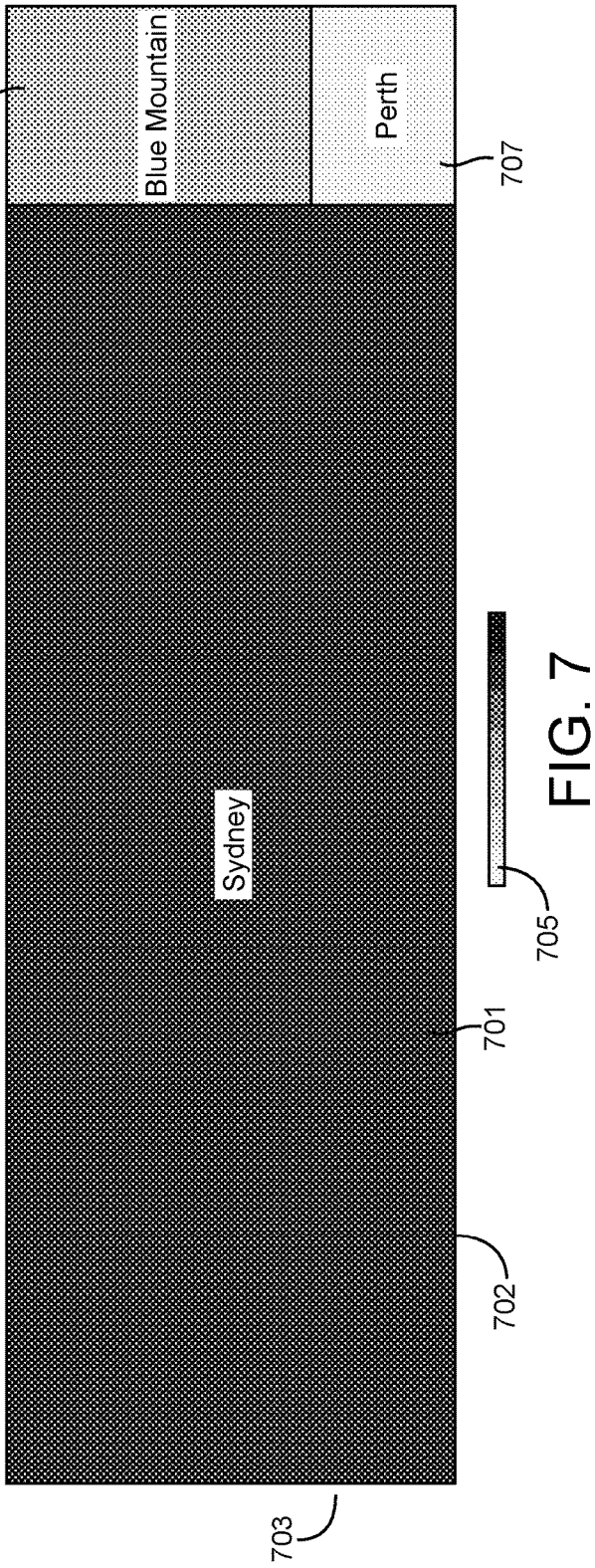
FIG. 7 is a drawing of a building equipment performance report generated by performing a three-dimensional analysis comparing building equipment performance over time, according to some embodiments.
Figure 8:
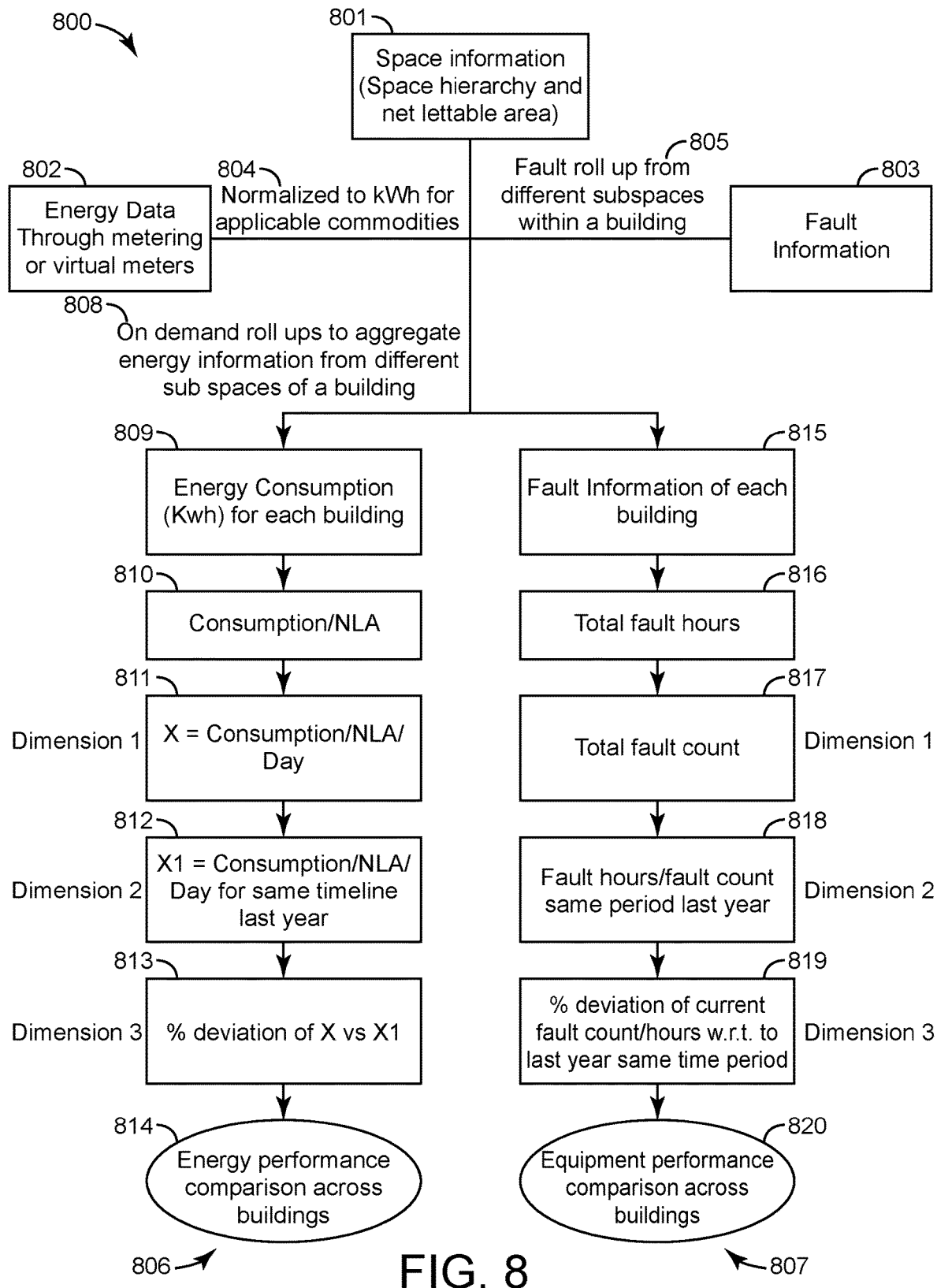
FIG. 8 is a flowchart of a process for performing a three-dimensional analysis for comparing building energy and building equipment performance, according to some embodiments.

Three-Dimensional Analysis for Comparing Building Energy and Equipment Performance Referring now to FIGS. 6-8, several drawings illustrating a three-dimensional analysis for comparing building energy and equipment performance are shown, according to some embodiments. The three-dimensional analysis can be performed by any of the building management systems described with reference to FIGS. 1-5. In some embodiments, the three-dimensional analysis is performed by the building energy management system described in detail in U.S. patent application Ser. No. 15/408,404 filed Jan. 17, 2017, the entire disclosure of which is incorporated by reference herein. In some embodiments, the three-dimensional analysis is part of a building enterprise management solution (BEMS) which can be implemented as a component of any of the previously-described BMSs.

Some BEMSs monitor data collected from multiple facilities or buildings within a portfolio. The buildings or facilities may be located in disparate geographies. The type of operations and energy consumption these buildings may vary greatly. Aspects of a BEMS application can include comparing buildings and facilities within the portfolio and benchmarking. However, some metrics to deliver this insight provide inaccurate information or compare buildings or facilities that are not reasonably similar. One type of performance comparison between buildings and facilities is an energy consumption comparison. Such a comparison may include classifying buildings or facilities with the highest energy consumption as being worst performing and classifying buildings or facilities with the lowest energy consumption as being best performing. However, this type of comparison may be inaccurate at comparing and peer to peer benchmarking. Additionally, some BEMSs that include fault detection and diagnostics for building equipment do not utilize the information drawn from the fault engine to further supplement this comparison and benchmarking activity.

The concept of introducing a three-dimensional analysis for facility/building energy and equipment performance may provide an accurate comparison across different facilities/buildings within a portfolio by first normalizing the values down to a comparable common factor and then applying relative comparison against each other. Advantageously, even if the building operations type may vary, they can be accurately compared against the others within that portfolio by arriving at a common denominator using the three-dimensional analysis. The resulting comparisons may truly reflect the potential of an enterprise management application.

The three-dimensional analysis may include calculating three different dimensions both across energy and fault information and arriving at a common denominator to provide an output that normalizes the impact of different operations of the buildings. The addition of a third dimension provides a more accurate picture across the portfolio relative to analyses that make use of only one or two of the dimensions. In some embodiments, the three-dimensional analysis concept is implemented as part of an enterprise management product, such as Metasys Enterprise Management by Johnson Controls.

Referring specifically to FIG. 6, an implementation of the three-dimensional analysis for comparing building energy performance is shown, according to an exemplary embodiment. The first dimension can be determined by the energy consumption or net lettable area per day for a selected timeline. The second dimension can be determined by the energy consumption or net lettable area per day for the selected timeline in a past year. The third dimension can be a percentage deviation of the first two dimensions.

Based on these three dimensions, the visualization shown in FIG. 6 can be derived as follows. The length 602 of a cell 601, 606-608 can be determined by the first dimension. The breadth 603 of a cell 601, 606-608 can be determined by the second dimension. The color of a cell 601, 606-608 can be determined by a relative comparison of the third dimension across different buildings within the portfolio. The color scale 605 may be adjusted automatically based on the relative values calculated.

When a building management system is deployed in a newly commissioned site, the second dimension may be absent for the first year, In this case, the first dimension can be applied across both the length 602 and breadth 603 of the cell 601, 606-608. When a building management system is deployed in an existing site, all three dimensions can be individually determined as previously described. When available data is more than a year, the second dimension may be based on average data for a given building. The average data may thereby form a benchmark specifically for that building and may increase the accuracy of the three-dimensional analysis Referring now to FIG. 7, an implementation of the three-dimensional analysis for comparing building equipment performance is shown, according to an exemplary embodiment. The first dimension can be determined by the total fault count across equipment, as derived from the rule engine for any building in the portfolio. The second dimension can be determined by the aggregated fault hours across equipment, as derived from the rule engine for any building in the portfolio. The third dimension can be a percentage deviation of either the first dimension compared against first dimension data from the previous year or the second dimension compared against second dimension data from the previous year. Both these views may be available to provide a different perspective to users to compare building equipment performance.

Based on these three dimensions, the visualization shown in FIG. 7 can be derived as follows. The length 702 of a cell 701, 706, 707 can be determined by the first dimension. The breadth 703 of a cell 701, 706, 707 can be determined by the second dimension. The color of a cell 701, 706, 707 can be determined by a relative comparison of the third dimension across different buildings within the portfolio. The color scale 705 may be adjusted automatically based on the relative values calculated.

When a building management system is deployed in a newly commissioned site, a new third dimension can be calculated. The new third dimension may be the ratio of fault count to fault hours and can be used for determining the color of cells. The lower this ratio the better a building is performing with respect to its equipment performance. The scale color can be automatically based on the relative ratios calculated in this particular scenario. When a building management system is deployed in an existing site, all three dimensions can be individually determined as previously described. When available data is more than a year, the second dimension may be based on average data for a given building. The average data may thereby form a benchmark specifically for that building and may increase the accuracy of the three-dimensional analysis. The rule engine may have the ability to reprocess historical data to return fault results, making the analysis more feasible.

Referring now to FIG. 8, a flowchart 800 of a process for performing a three-dimensional analysis to derive the visualizations shown in FIGS. 6-7 is shown, according to an exemplary embodiment. The three dimensional analysis system may receive space information (space hierarchy and net lettable area) 801, energy data through metering or virtual meters 802, and fault information 803. Energy data 802 may be normalized to kWh for applicable commodities (step 804). Fault information 803 may include fault roll up from different subspaces within the building (step 805). The left branch 806 of FIG. 8 illustrates the steps for deriving the visualization shown in FIG. 6, whereas the right branch 807 of FIG. 8 illustrates the steps for deriving the visualization shown in FIG. 7.

The left branch 806 may perform on-demand roll ups to aggregate energy information from different subspaces of a building (step 808) to generate energy consumption for each building 809. Energy consumption for each building 809 can then be divided by the net lettable area of that building (NLA) (step 810). For each building, the first dimension can then be calculated as energy consumption per NLA per day (step 811). The second dimension may be calculated similarly, using consumption and NLA information for the same timeline the previous year (step 812). The third dimension may then be found as a percentage deviation between the first dimension and the second dimension (step 813). The left branch 806 thereby provides energy performance comparison across buildings (step 814).

The right branch 807 may utilize fault information of each building 815, total fault hours 816, and the total fault count 817. The first dimension can be defined by total fault count (step 817). The second dimension can be calculated as the fault hours divided by fault count for the same period last year (step 818). The third dimension may be defined by a percentage deviation of current fault count per fault hours with respect to the same period last year (step 819). The right branch 807 thereby provides equipment performance comparison across buildings 820.

On-Demand Roll-Ups

Referring now to FIGS. 9-12, several drawings illustrating on-demand roll-ups of meters in a building management system are shown, according to some embodiments. The on-demand roll-ups can be generated by any of the building management systems described with reference to FIGS. 1-5. In some embodiments, the on-demand roll-ups are generated by the building energy management system described in detail in U.S. patent application Ser. No. 15/408,404 filed Jan. 17, 2017.

A building management system may include various meters along with points. Data from the meters can be monitored to determine the consumption and demand of spaces where the meters are located. In some embodiments, a building management system can perform automated roll-ups of the meters. However, if the meters serving a particular space are removed or added, it can be difficult to account for this change through a dynamic process initiated by the user through the UI. Changes to the meter configuration can be implemented on the backend, which may trigger recalculations. In some instances, the recalculations can take days to complete. Advantageously, the on-demand roll-ups of meters described herein may be based on linking or delinking of meters from the roll-up. Accordingly, changes to the meters may take effect immediately.

Figure 9:
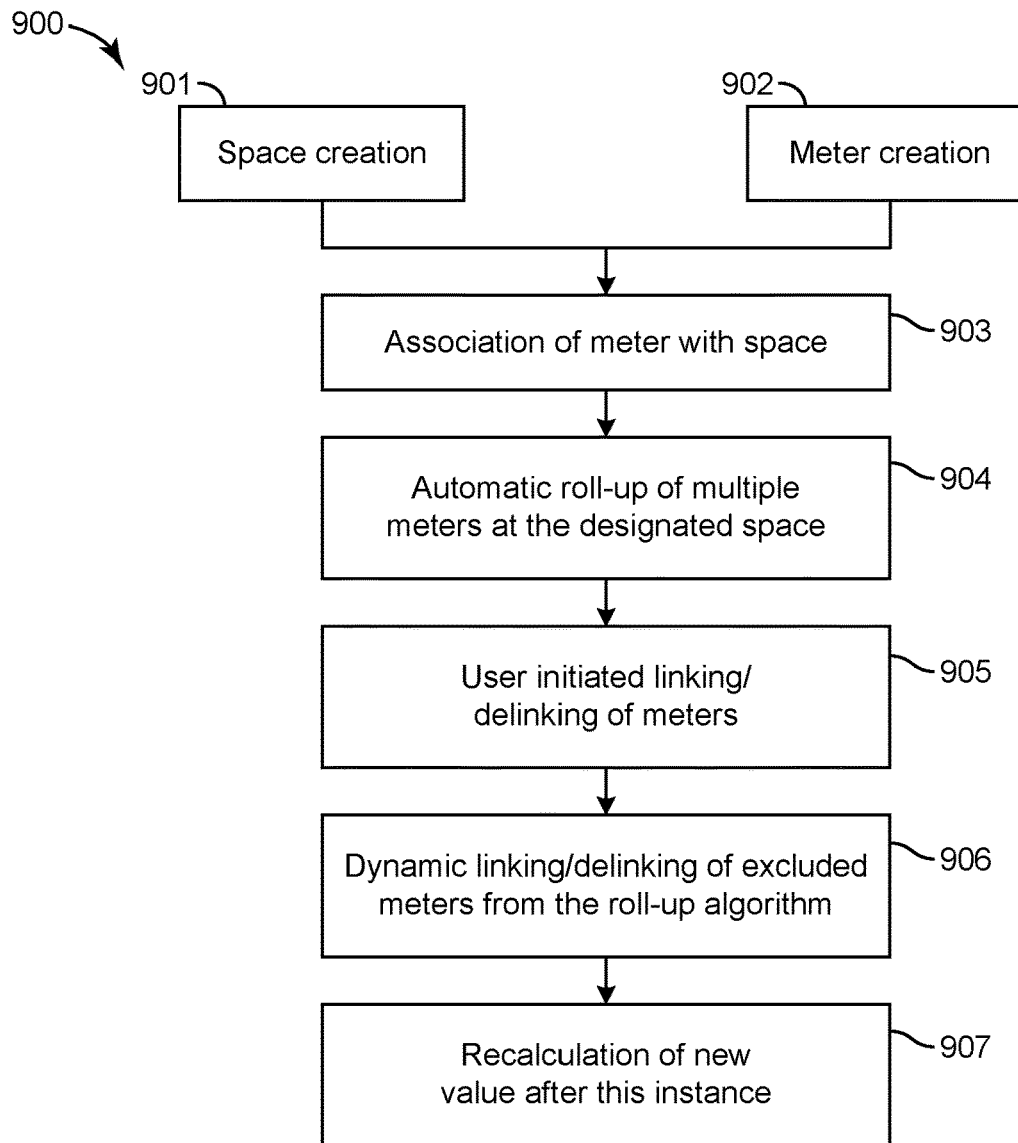
FIG. 9 is a flowchart of a process for creating on-demand roll-ups of meters in a BMS, according to some embodiments.

Referring particularly to FIG. 9, a flowchart 900 illustrating the on-demand roll-ups is shown, according to an exemplary embodiment. The process begins with space creation (step 901) and meter creation (step 902). The meter is then associated with the space (step 903). The process may include an automatic roll-up of multiple meters at a designated space (step 904). A user may initiate linking or delinking of meters (step 905). This may cause a dynamic linking or delinking or excluded meters from the roll-up algorithm (step 906). After the dynamic linking or delinking, new values can be calculated (step 907).

Figure 10:
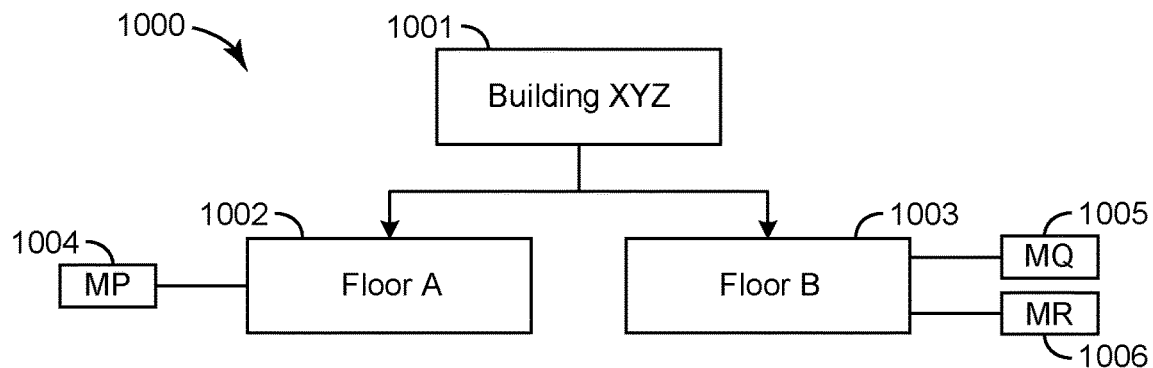
FIG. 10 is a block diagram illustrating a hierarchy of spaces within a building, according to some embodiments.

Referring now to FIG. 10, a flowchart 1000 illustrating an example of the on-demand roll-up process is shown, according to an exemplary embodiment. Consider a building XYZ 1001 that has two floors in it, Floor A 1002 and Floor B 1003. Building XYZ 1001 may include three meters serving it, designated as MP 1004, MQ 1005 & MR 1006. The building management system can automatically calculate the building energy consumption as MP+MQ+MR. If a user removes meter MR 1006 at a later time (e.g., due to some building modification), the building management system may have the capability to remove this meter MR 1006 from calculation to showcase building consumption.

Figures 11, 12:
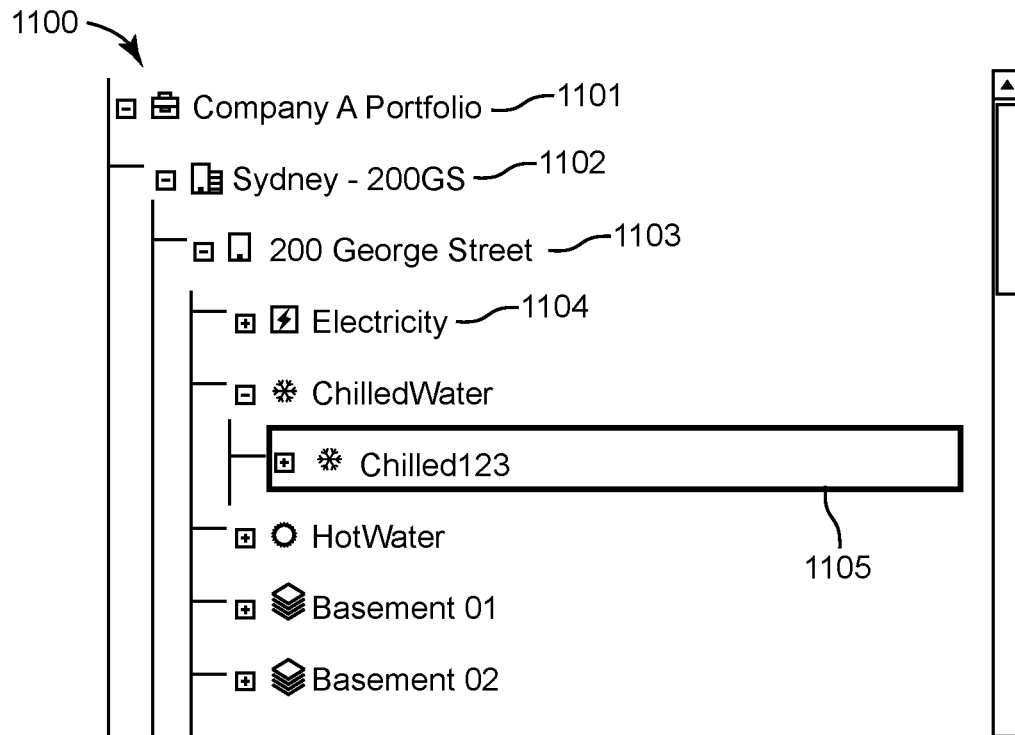
FIG. 11 is a drawing of a user interface for viewing and selecting meters in a BMS, according to some embodiments.
FIG. 12 is a drawing of a user interface for selecting whether a meter is included in a roll-up, according to some embodiments.

Referring now to FIGS. 11-12, a user interface 1100 which can be generated by the building management system is shown, according to an exemplary embodiment. FIG. 11 shows a collapsible list, including a property portfolio 1101, a facility 1102, a building named "200 George Street" 1103, a list of building subsystems 1104, and a chilled water meter named "Chilled 123" 1105. When the user clicks on the meter "Chilled123" 1105, the user may be provided with an interface 1200 (shown in FIG. 12) to enable or disable roll ups by selecting "Yes" 1203 or "No" 1201 respectively. If the user chooses "No" 1201 and clicks "Save" 1202, the meter "Chilled 123" 1101 may be removed from the calculations for building "200 George Street" 1103. Conversely, if a meter was previously excluded from a roll-up and the user clicks on the meter and selects "Yes" 1203, the meter may be automatically included in the roll-up. The user may also use drop down menus 1204-1208 to modify other attributes of the selected meter 1105. The roll-ups can be done for any points under the meter (e.g., demand, consumption, apparent power, etc.). Advantageously, the user can easily add or remove the meter from roll-ups on demand from the interface 1200. The calculations may work seamlessly to ensure the user gets the information provided by the meters.

Scorecards for Building Energy and Equipment Performance

Referring now to FIGS. 13-16, several drawings illustrating scorecards for building energy and equipment performance are shown, according to some embodiments. The scorecards are user interfaces which can be generated by any of the building management systems described with reference to FIGS. 1-5. In some embodiments, the scorecards are generated by the building energy management system described in detail in U.S. patent application Ser. No. 15/408,404 filed Jan. 17, 2017.

In some building enterprise management solutions, it can be cumbersome to understand in one single snapshot how the building is faring with respect to its energy and equipment performance. For example, a user may be required to navigate to various visualizations within the software and collate the data manually to arrive at any logical conclusion. The scorecard described herein may include essential information in building enterprise management solutions that provides a holistic view on the overall energy performance of buildings and how critical equipment are performing, all from one single view.

The key performance indicators (KPIs) included in the scorecard can be derived from data from different sources and can be displayed as valuable insights which are logically arranged in a sequential manner which would make most sense to a building owner or facility manager. For example, the scorecard may fully leverage the advantage of a sub-metering investment made within the various sub-spaces of the building. The scorecard may account for critical equipment such as chillers and whether they are performing within desired limits. It may be desirable to view this information from one single user interface.

Figure 13:
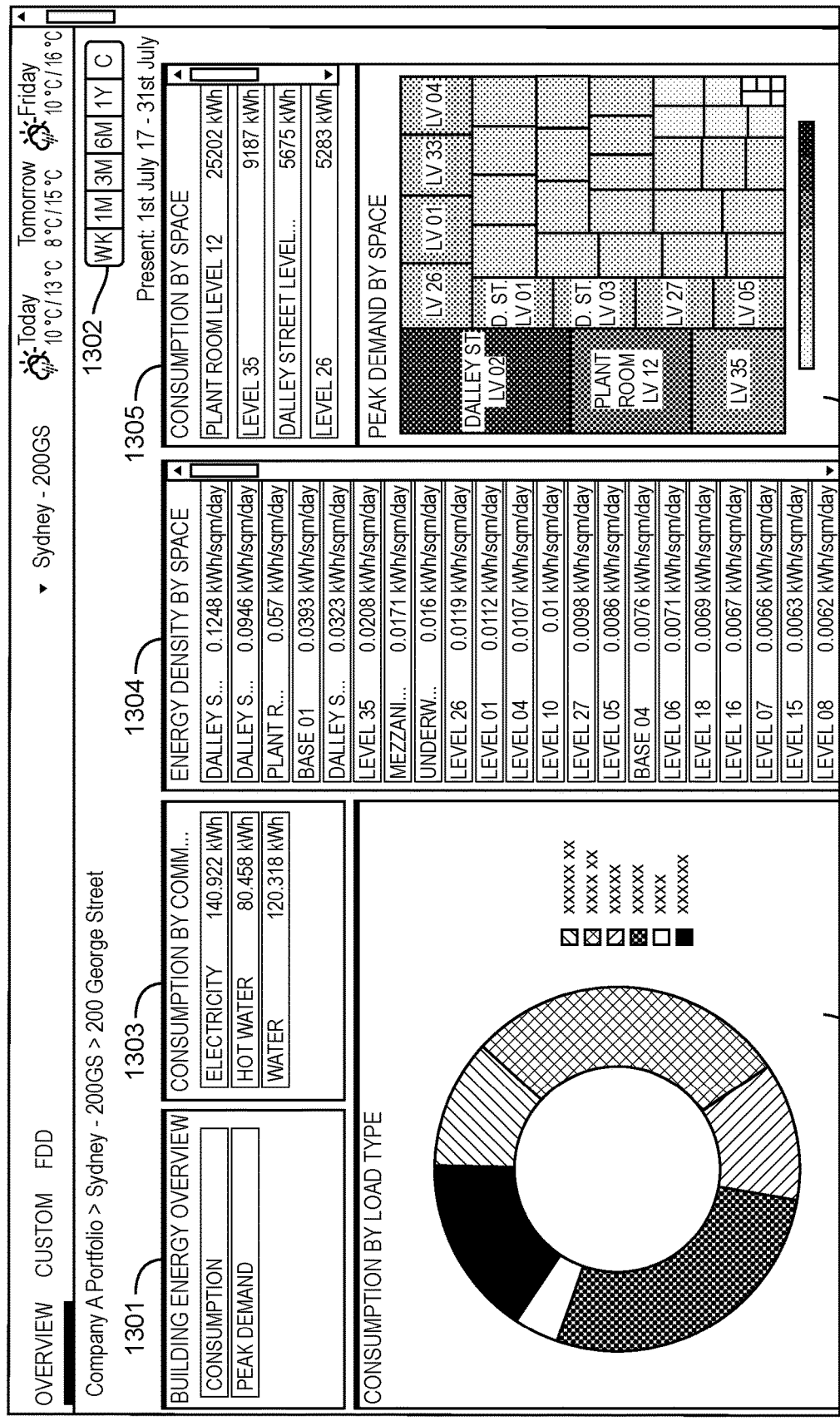
FIG. 13 is a drawing of a scorecard for evaluating building energy and equipment performance, according to some embodiments.

Referring particularly to FIG. 13, a scorecard 1300 for evaluating building energy and equipment performance is shown, according to an exemplary embodiment. The scorecard 1300 may be a building energy scorecard which provides a single snapshot holistic view of how the building and its subspaces are performing in terms of energy consumption and its various derivatives. The view shown in FIG. 13 may become available once any building is selected from the left hand navigation tree.

The widget "Building Energy Overview" 1301 may automatically roll-up the consumption of the subspaces within the building (e.g., floors, wings and rooms) and show the normalized energy consumption of the entire building as a single entity for the selected time period. Time selection 1302 may be available on the upper right corner and can be switched easily between one week, one month, three months, six months, one year, or any other custom timeline (e.g., yesterday, last 24 hours, last week, last 30 days, last 6 months, or any custom range). In some embodiments, the peak demand registered within the building is shown within this widget The widget "Consumption By Commodity" 1303 may breakdown the entire building's consumption by the different types of commodity being used within the building. The widget "Energy Density By Space" 1304 may be derived from an automated calculation of kWh/unit area/day for all the subspaces within the building. The subspaces within the widget may be automatically arranged in a descending fashion by highlighting the spaces which have the highest energy density within the building. The "Consumption By Space" widget 1305 may arrange the subspaces in a descending fashion by highlighting the spaces which register the highest consumption on the top of the list.

All these derived outputs may be supplemented by two visual ques in the form of a "Consumption by Load Type" widget 1306 and a "Peak Demand By Space" widget 1307. The consumption by load type widget may breakdown the energy consumption of the building into various categories (e.g., HVAC, chillers, lighting, hot water, pump and auxiliary, plug load, etc.). The peak demand by space widget 1307 provides a thermal map where the cell size is determined by the peak demand value and the cell color is automatically derived from the relative values registered from various spaces in terms of demand.

This entire view as one entity becomes an unique demonstration of building's energy performance and is termed as "Building Energy Performance Scorecard." This entire set of data can be extracted in .csv format and can be submitted for any auditory purposes or for earning credits for achieving various environmental benchmark (LEED, NABERS, etc.).

Figure 14:
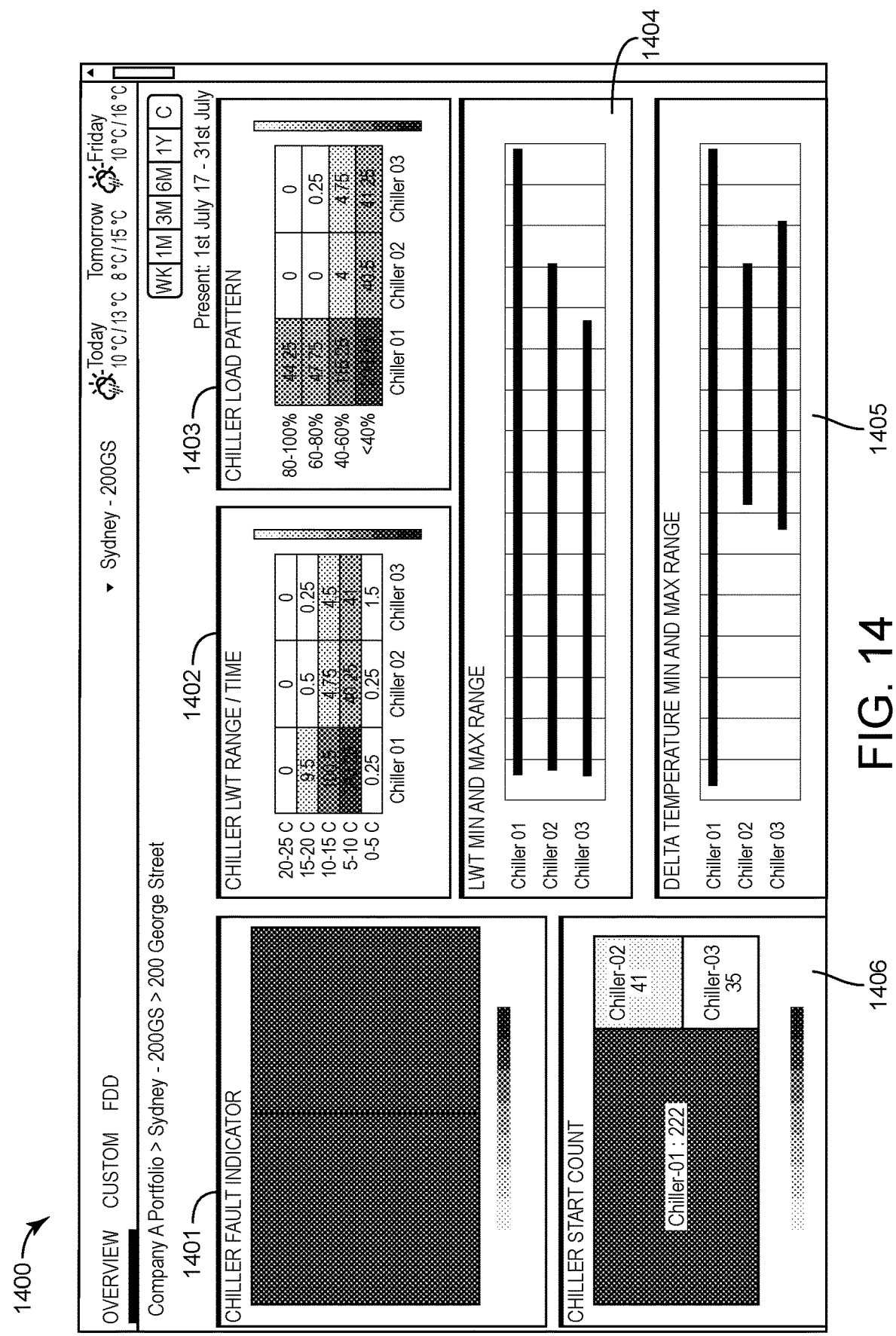
FIG. 14 is a drawing of an equipment scorecard for a chiller, according to some embodiments.

Referring now to FIG. 14, an equipment scorecard 1400 for a chiller is shown, according to an exemplary embodiment. The equipment scorecard 1400 can be used to view information for individual devices of equipment.

The "Chiller Fault Indicator" widget 1401 may display an open number of faults with respect to individual chillers.

This is followed by two highly valued pieces of information provided in the Chiller Leave Water Temperature (LWT) with Respect to Time" widget 1402 and the "Chiller Load Pattern" widget 1403. Both these widgets may be a combination of heat map and bin analysis and provide powerful insights in determining in which range of temperature and load pattern each individual chiller is spending most of its time.

The scorecard may include two other bin analysis widgets including a "Chiller LWT Min and Max Range" widget 1404 and a "Delta Temperature Min and Max Range" widget 1405, which indicate the chiller leaving water temperature minimum and maximum temperature range and the minimum and maximum temperature differential when the chillers are operational.

The "Chiller Start Count" widget 1406 may indicate chiller start counts which efficiently lets a facility manager or any chiller expert understand the fact if chillers are catering to the load as per sequencing logics which have been implemented at site.

All these put together provide a unique scorecard for chillers. A single snapshot lets a user understand whether these critical equipment are performing as intended or are there any major deviations from ideal conditions. This scorecard concept may be provided as part of enterprise analytics solutions and can be used as part of any dashboard based analytics platform.

Figure 15:
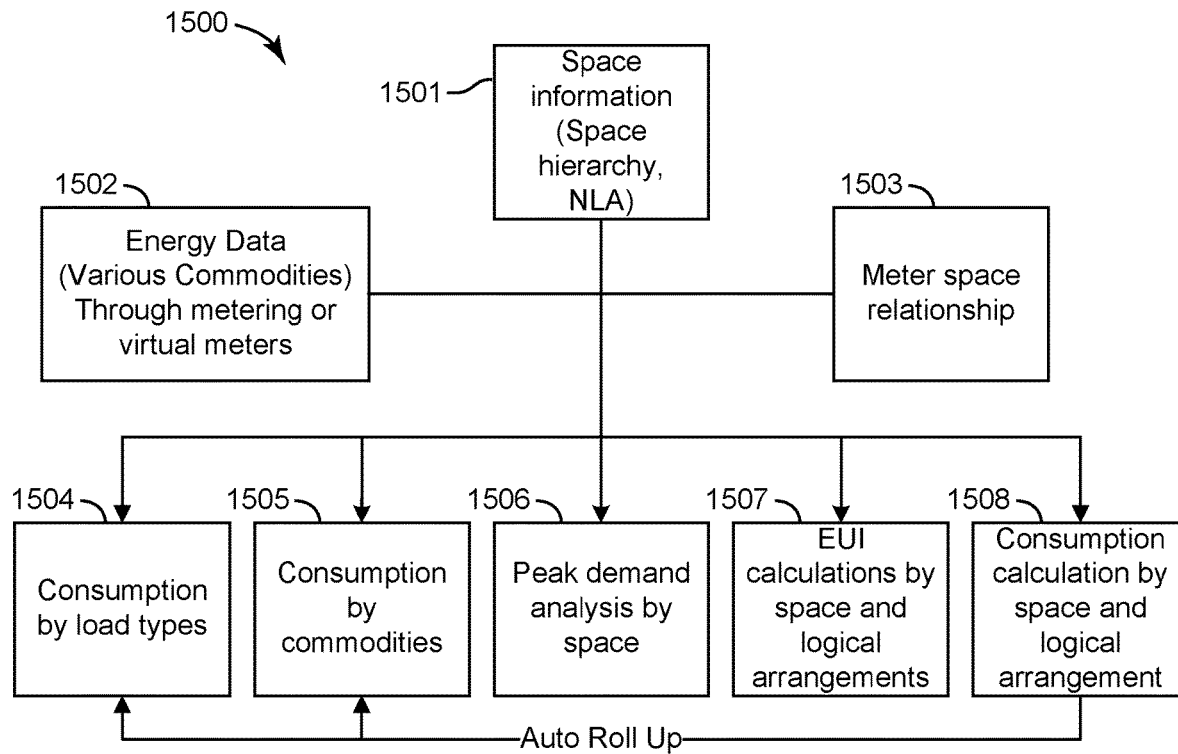
FIG. 15 is a block diagram illustrating the data inputs and information in a scorecard for evaluating building energy and equipment performance, according to some embodiments.
Figure 16:
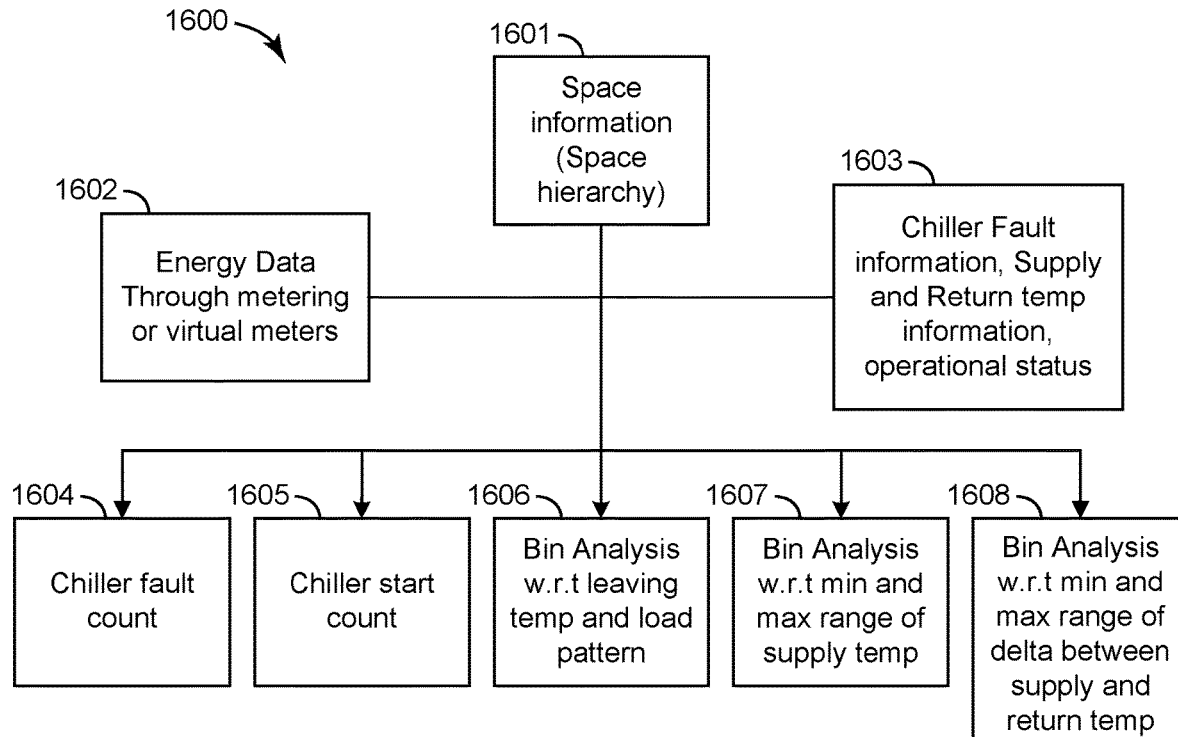
FIG. 16 is a block diagram illustrating the data inputs and information in an equipment scorecard for a chiller, according to some embodiments.

Referring now to FIGS. 15-16, block diagrams 1500, 1600 illustrating a building energy scorecard and a building equipment (chiller) scorecard are shown, according to an exemplary embodiment. The building energy scorecard may use space information 1501, energy data through metering or virtual meters 1502, and a meter space relationship 1503 to generate the information shown in the scorecard. This information may include consumption by load types 1504, consumption by commodities 1505, peak demand analysis by space 1506, energy use intensity (EUI) calculations by space and logical arrangements 1507, and consumption calculation by space and logical arrangements 1508.

Similarly, the building equipment scorecard may use space information 1601, energy data through metering or virtual meters 1602, chiller fault information, supply and return water temperature information, and operational status information 1603 to generate the information shown in the scorecard. This information may include chiller fault count 1604, chiller start count 1605, bin analysis with respect to leaving temperature and load pattern 1606, bin analysis with respect to minimum and maximum range of supply temperature 1607, and bin analysis with respect to maximum and minimum range of delta between supply and return temperatures 1608.

Plant Room Dashboard

Referring now to FIGS. 17-27, several drawings illustrating a plant room dashboard 1700 are shown, according to some embodiments. The plant room dashboard 1700 is a user interface which can be generated by any of the building management systems described with reference to FIGS. 1-5. In some embodiments, the plant room dashboard is generated by the building energy management system described in detail in U.S. patent application Ser. No. 15/408,404 filed Jan. 17, 2017.

In some building enterprise management solutions, it can be cumbersome to understand in one single snapshot how the building is faring with respect to its energy and equipment performance. For example, a user may be required to navigate to various visualizations within the software and collate the data manually to arrive at any logical conclusion.

The plant room dashboard described herein provides a holistic view on the overall energy performance and operational efficiency of how critical plant room equipment are performing, all from one single section.

The plant room dashboard 1700 may include information available from macro to micro levels with respect to the plant room's critical equipment. The plant room dashboard 1700 may also correlate energy performance of these equipment sets with their performance index in terms of operational efficiency and other parameters which have a direct correlation to energy. The different parameters in the plant room equipment can be compared, which provides invaluable insights for a building owner or a facility manager. The plant room dashboard 1700 may provide a comprehensive and complete view of the plant room as an entity in the form of key information with respect to its performance and optimization opportunities.

In some embodiments, the plant room dashboard 1700 is implemented as part of an enterprise management and analytics offering. The plant room dashboard 1700 can be used by large universities and central plants to provide additional value, and can also be used by central plant optimization (CPO) jobs where monitoring the outcomes of applying CPO techniques is a key aspect. The savings and performance improvements as a result can directly be reflected in this dedicated section. Informed decisions can be made on further improvements.

Figure 17:
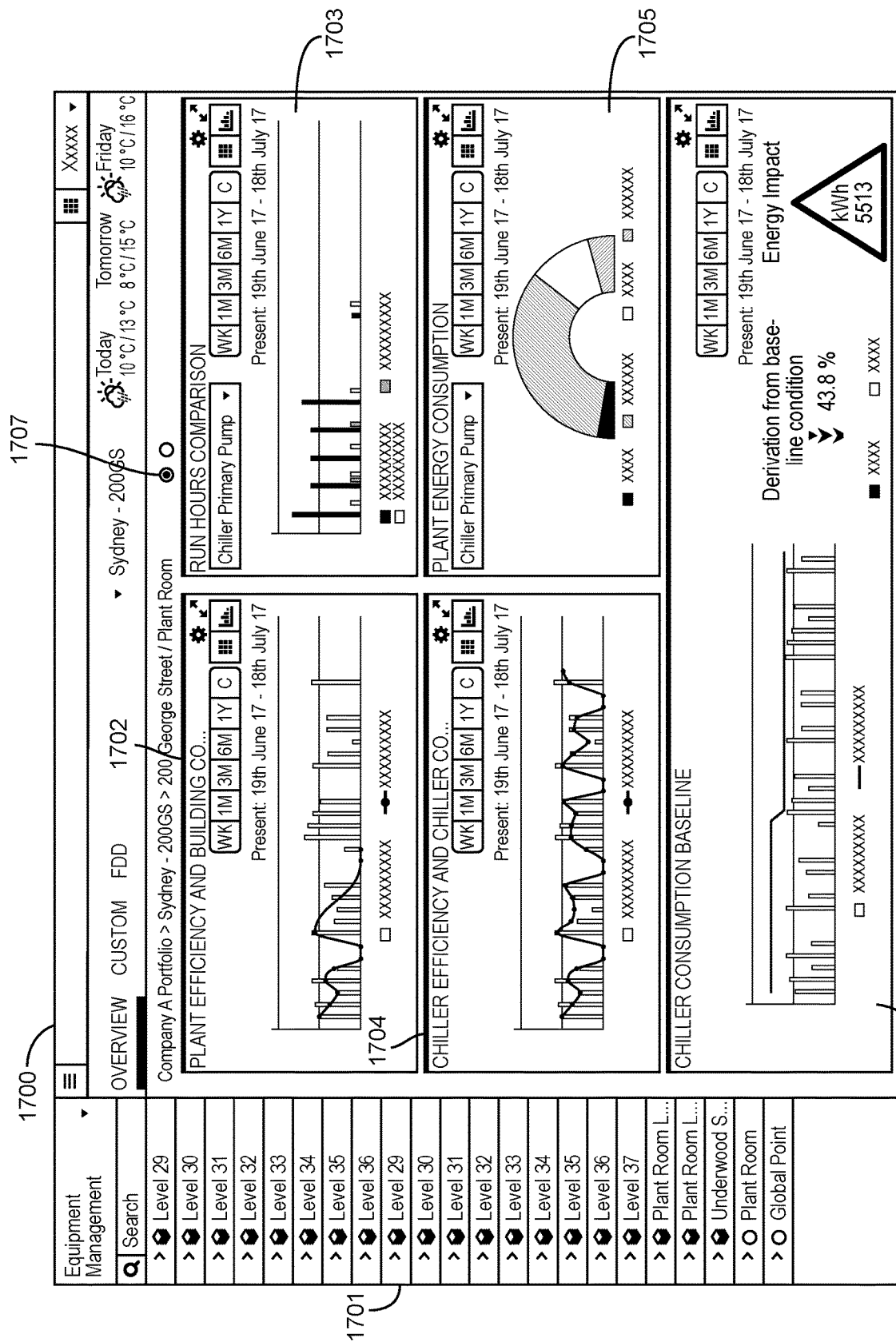
FIG. 17 is a drawing of a plant room dashboard including a set of widgets, according to some embodiments.
Figure 18:
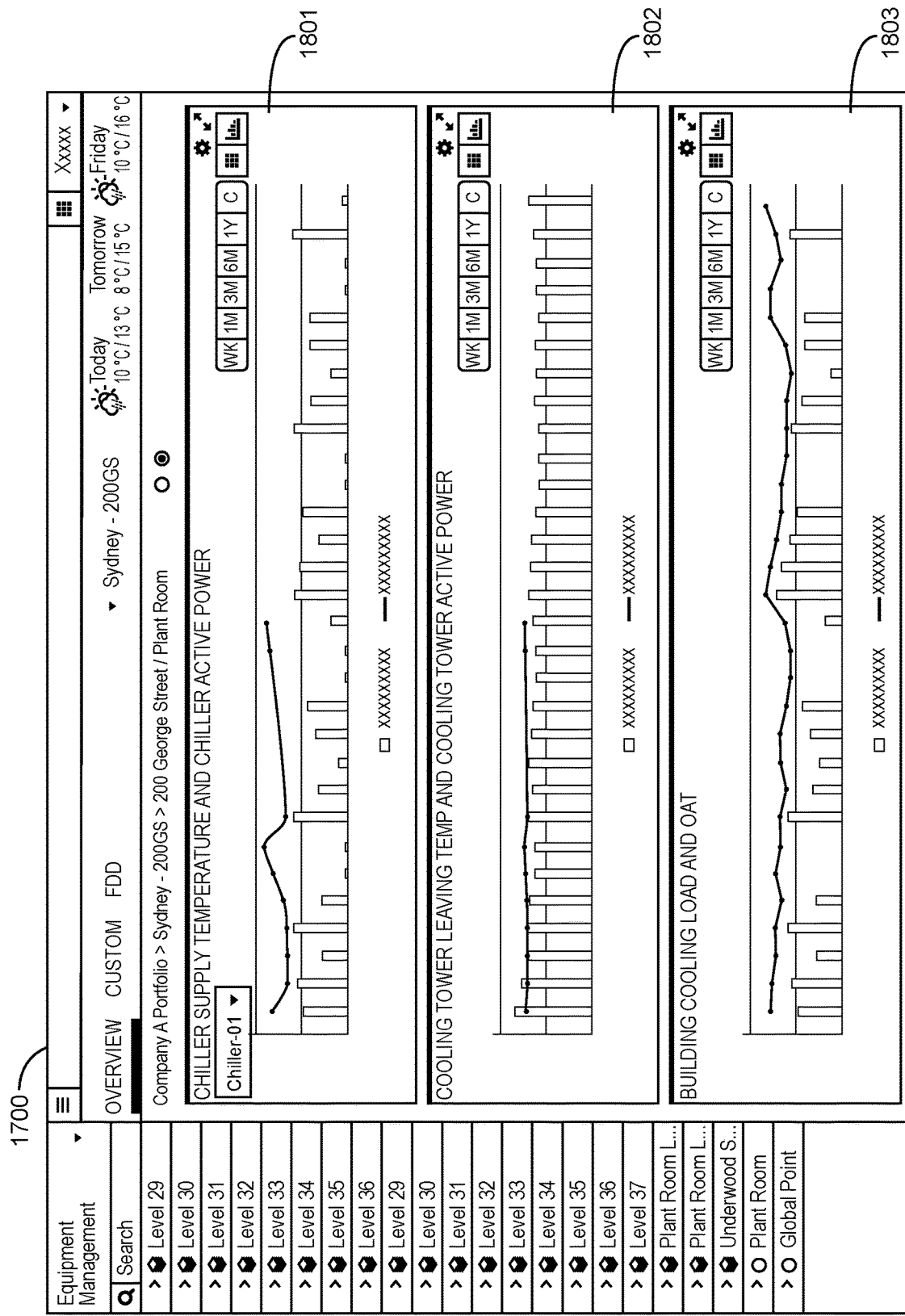
FIG. 18 is another drawing of a plant room dashboard including another set of widgets, according to some embodiments.

Referring specifically to FIGS. 17-18, several drawings of the plant room dashboard 1700 are shown, according to an exemplary embodiment. The plant room dashboard 1700 can be viewed by clicking on the plantroom placeholder 1701 (i.e., "Plant Room") created by default under each building level. In FIG. 17, the plant room dashboard is shown to include a "Plant Efficiency and Building Cooling Load" widget 1702, a "Run Hours Comparison" widget 1703, a "Chiller Efficiency and Chiller Cooling Load" widget 1704, a "Plant Energy Consumption" widget 1705, and a "Chiller Consumption Baseline" widget 1706.

Clicking on the second radio button 1707 may cause the view shown in FIG. 18 to be displayed. In FIG. 18, the plant room dashboard 1700 is shown to include a "Chiller Supply Temperature and Chiller Active Power" widget 1801, a "Cooling Tower Leaving Temperature and Cooling Tower Active Power" widget 1802, and a "Building Cooling Load and Outdoor Air Temperature (OAT)" widget 1803. Each of these widgets is described in detail below.

Figure 19:
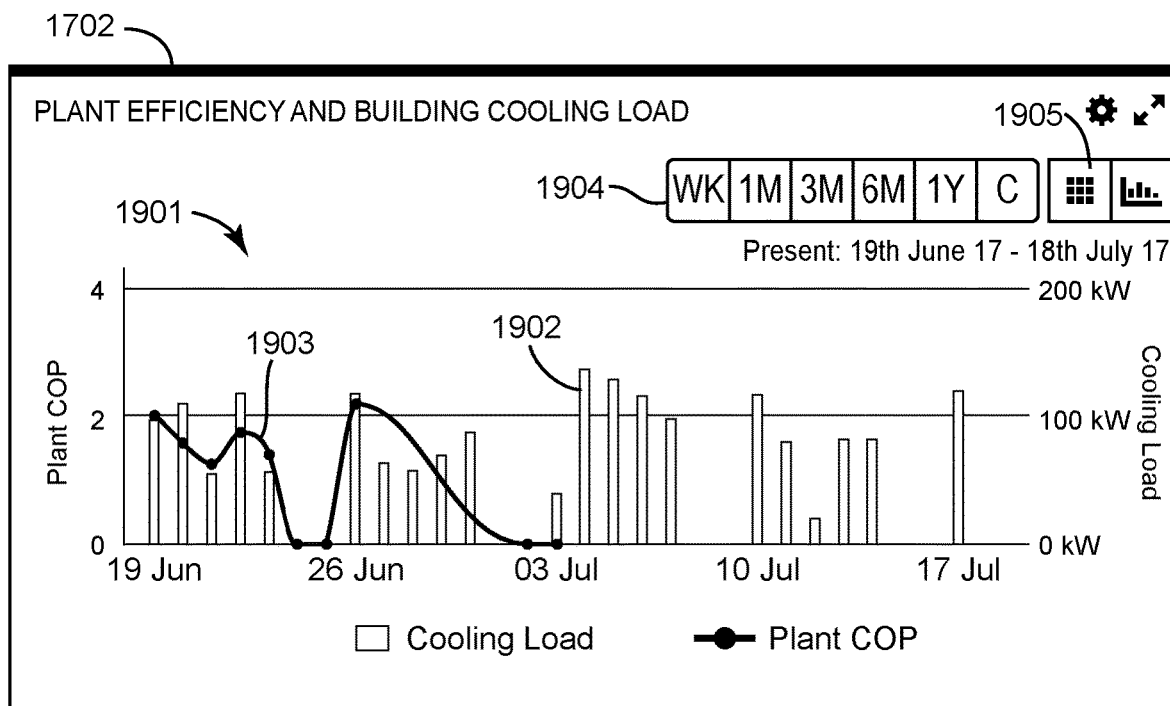
FIG. 19 is a drawing of a plant efficiency and building cooling load widget which can be included in the plant room dashboard of FIG. 17, according to some embodiments.

Referring now to FIG. 19, the "Plant Efficiency and Building Cooling Load" widget 1702 is shown, according to an exemplary embodiment. The widget is shown to include a chart 1901 which provides the key performance indicators of plant efficiency (COP) and building cooling load. The bar chart 1902 represents the building cooling load, whereas the line chart 1903 represents plant efficiency.

A time selection 1904 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 1905.

Figure 20:
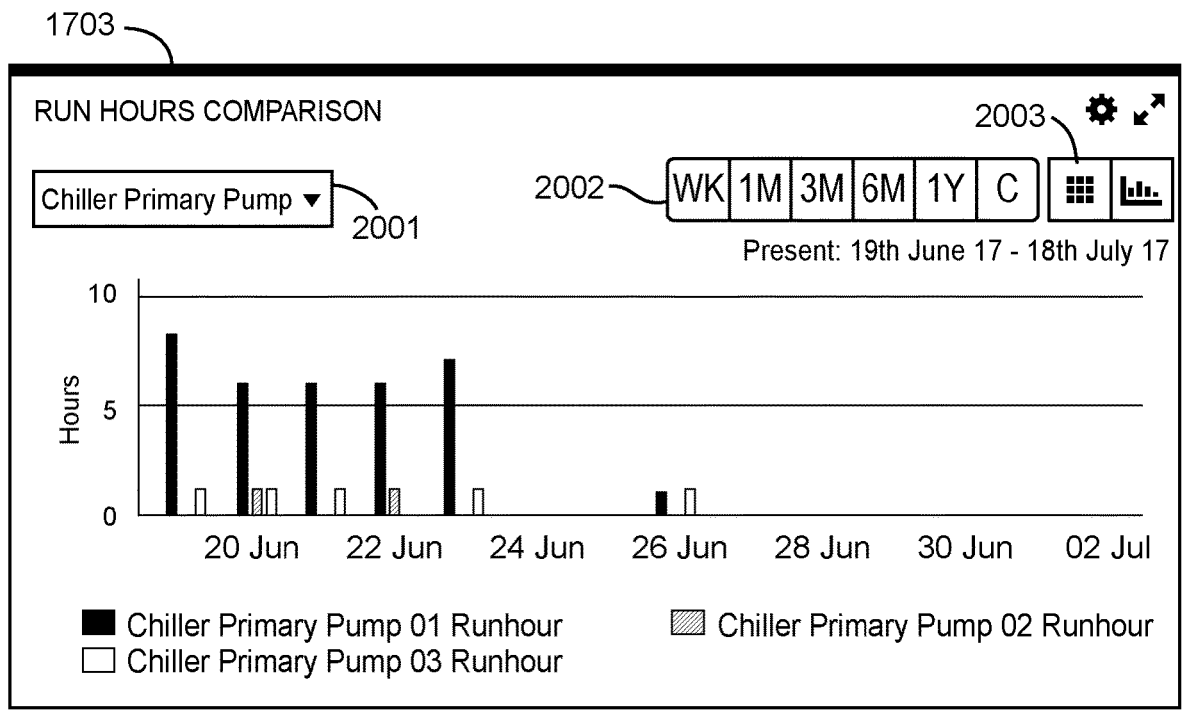
FIG. 20 is a drawing of a run hours comparison widget which can be included in the plant room dashboard of FIG. 17, according to some embodiments.

Referring now to FIG. 20, the "Run Hours Comparison" widget 1703 is shown, according to an exemplary embodiment. The widget may display a run hour comparison for equipment such as chillers, primary pumps, secondary pumps, tertiary pumps, condenser pumps and cooling towers for the selected time resolution. The equipment can be selected from the drop down menu 2001 presented on the left hand side of the chart.

A time selection 2002 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 2003.

Figure 21:
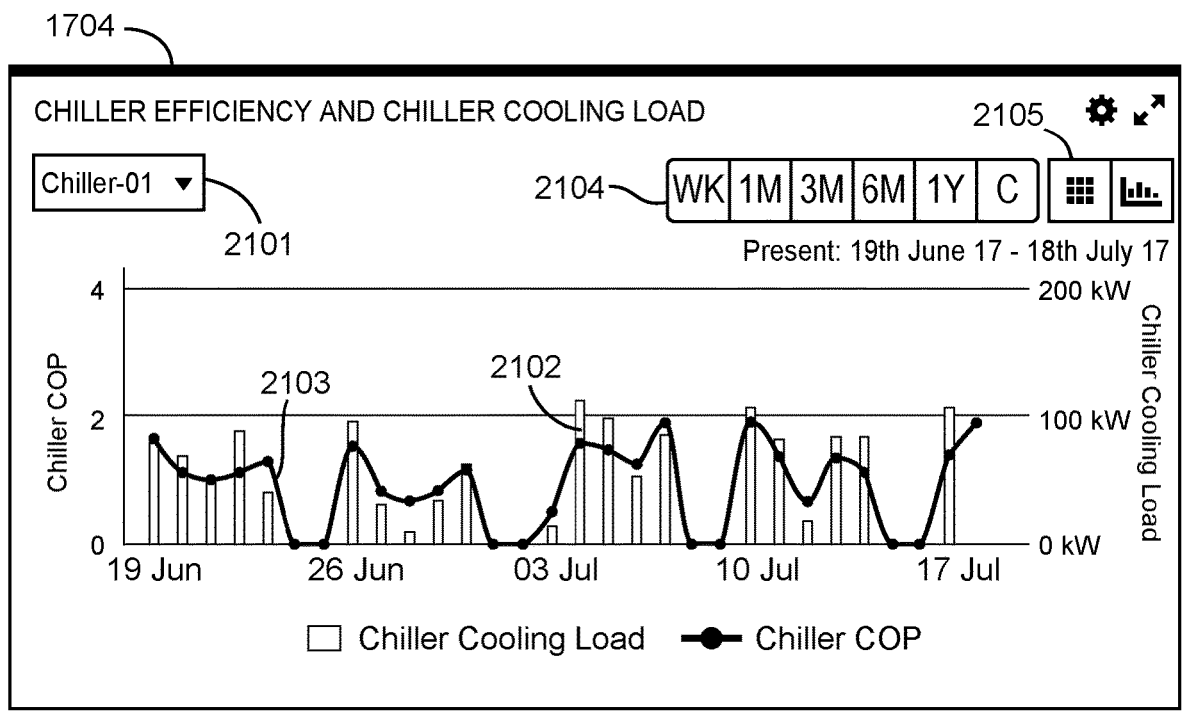
FIG. 21 is a drawing of a chiller efficiency and chiller cooling load widget which can be included in the plant room dashboard of FIG. 17, according to some embodiments.

Referring now to FIG. 21, the "Chiller Efficiency and Chiller Cooling Load" widget 1704 is shown, according to an exemplary embodiment. The widget may display the individual chiller efficiencies (COP) against the cooling loads catered by the chillers for the selected time resolution. Individual chiller selection can be made from the upper left corner drop down menu 2101. The bar chart 2102 represents chiller load, whereas the line chart 2103 represents chiller COP.

A time selection 2104 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 2105.

Figure 22:
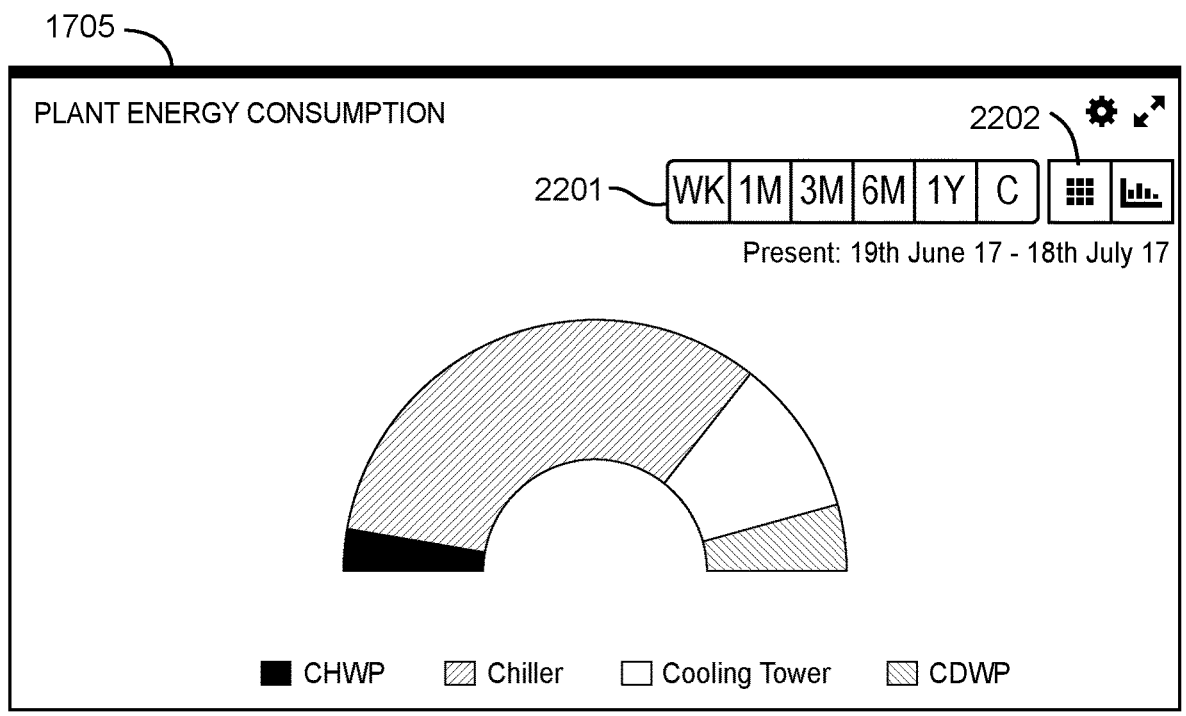
FIG. 22 is a drawing of a plant energy consumption widget which can be included in the plant room dashboard of FIG. 17, according to some embodiments.

Referring now to FIG. 22, the "Plant Energy Consumption" widget 1705 is shown, according to an exemplary embodiment. This widget may correlate energy with plant room equipment. The widget may display plant room equipment energy consumption as percentages as well as consumption values. The widget may provide valuable insight as to what equipment type consumes how much energy by providing a detailed breakdown as displayed below.

A time selection 2201 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 2202.

Figure 23:
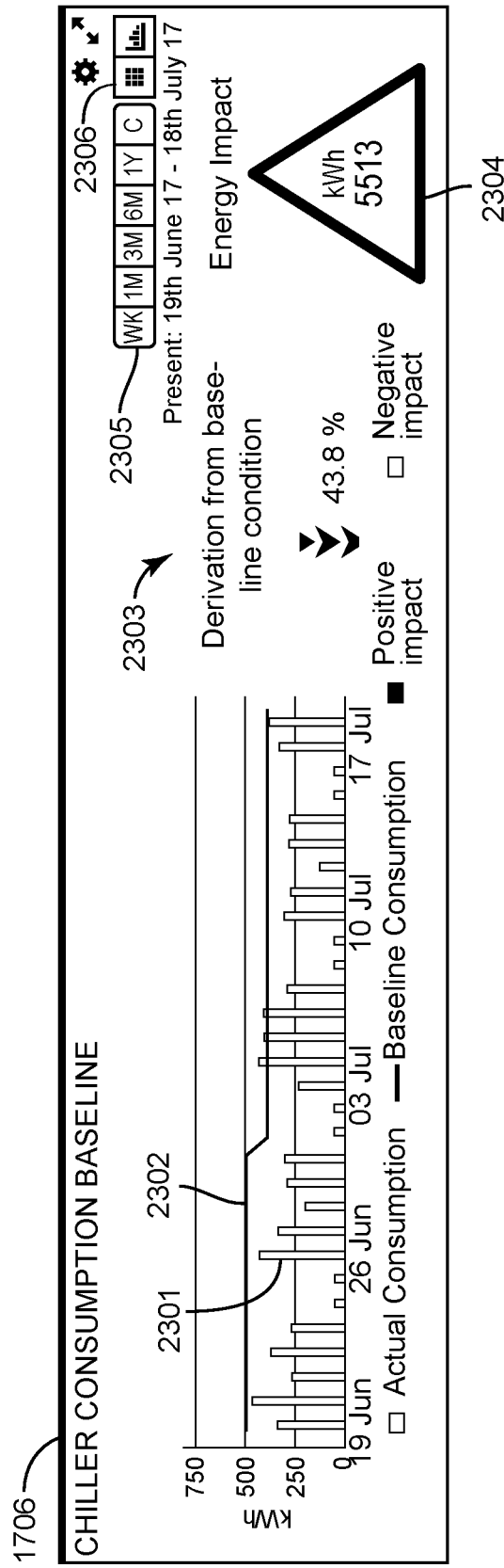
FIG. 23 is a drawing of a chiller consumption baseline widget which can be included in the plant room dashboard of FIG. 17, according to some embodiments.

Referring now to FIG. 23, the "Chiller Consumption Baseline" widget 1706 is shown, according to an exemplary embodiment. This widget may correlate energy with a chiller system. The widget may display the energy consumption 2301 of the chiller system against a reference energy consumption baseline 2302. This will help in understanding how much the chiller system has consumed with respect to the reference provided. The widget may also display deviation in form percentage 2303 from the baseline condition and the amount energy saved or exceeded 2304 as displayed in the right hand portion of the widget.

Time resolution operation for this widget may be different than previously described. Any timeline selected may display for the past period. For example, selecting the one month option on the time selection 2305 may display the month's deviation and impact. Selecting the three month option may display the three month deviation and impact and so on. Calculations may be defined on a complete month basis, which may depend on the baseline provided. The month's baseline can be broken down to days for the applicable resolutions (e.g., month by day, week by day, etc.). A user can view the data in grid format by clicking on the grid toggle 2306.

Chiller baseline consumption may be subtracted from the chiller actual consumption to derive the deviation and absolute savings. This calculation may be performed based on the selected timeline. The deviation can be defined as:

Deviation=((Actual Consumption−Baseline Consumption)/Baseline Consumption)*100=value expressed as a percentage deviation whereas the savings can be defined as:

Savings=Actual Consumption−Baseline Consumption.

Figure 24:
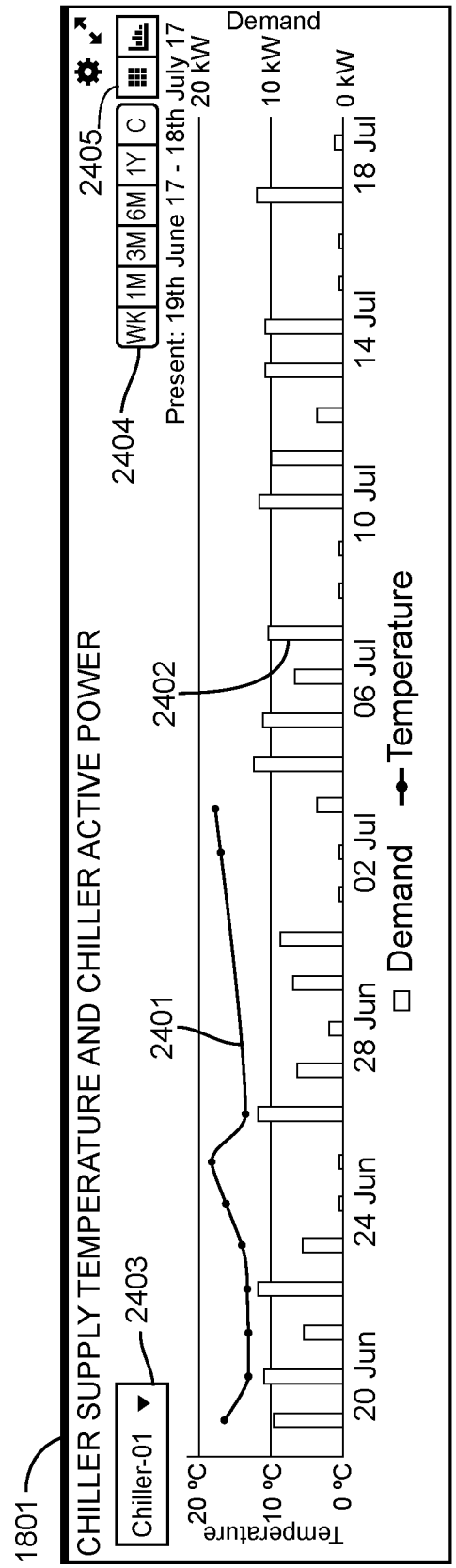
FIG. 24 is a drawing of a chiller supply temperature and chiller active power widget which can be included in the plant room dashboard of FIG. 18, according to some embodiments.

Referring now to FIG. 24, the "Chiller Supply Temperature and Chiller Active Power" widget 1801 is shown, according to an exemplary embodiment. This widget may provide optimization opportunities for individual chillers by correlating the energy counterpart with the respective equipment for the selected time resolution. The widget may display the individual chiller supply temperature 2401 against its active power 2402, thereby displaying under what supply temperature conditions active power is most optimal. Individual chiller selection can be made from the left hand corner drop down menu 2403.

A time selection 2404 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 2405.

Figure 25:
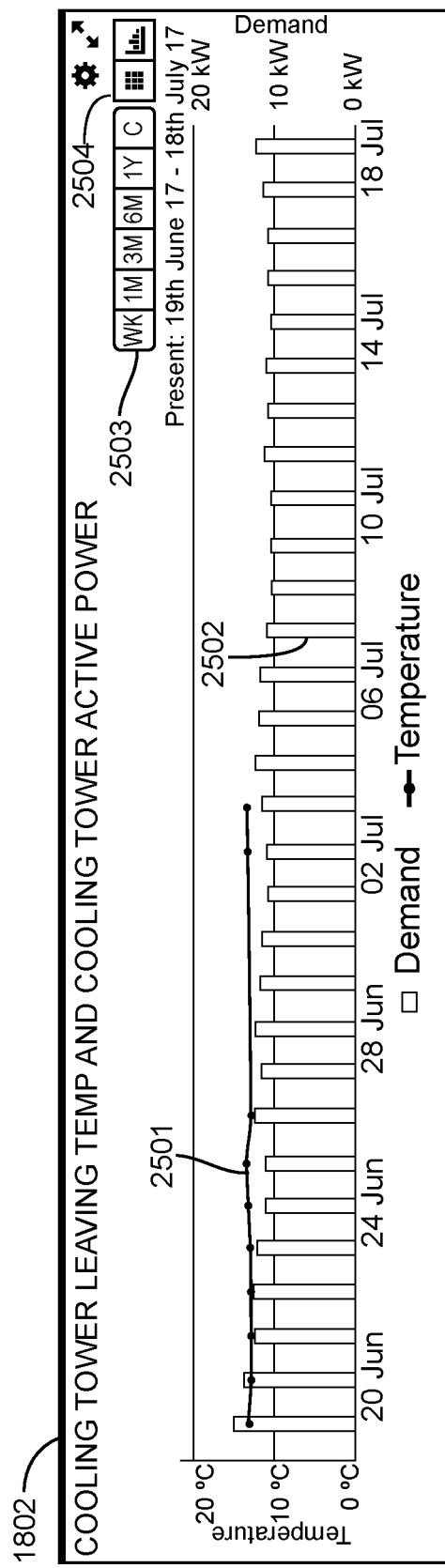
FIG. 25 is a drawing of a cooling tower leaving temperature and cooling tower active power widget which can be included in the plant room dashboard of FIG. 18, according to some embodiments.

Referring now to FIG. 25, the "Cooling Tower Leaving Temperature and Cooling Tower Active Power" widget 1802 is shown, according to an exemplary embodiment. This widget may provide optimization opportunities for cooling towers by correlating the energy counterpart with the system for the selected time resolution. The widget may display the cooling tower header supply temperature 2501 against the active power 2502, thereby displaying under what supply temperature conditions active power is most optimal. Cooling tower leaving water temperature and active power can be averaged and plotted as per the selected timeline.

A time selection 2503 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 2504.

Figure 26:
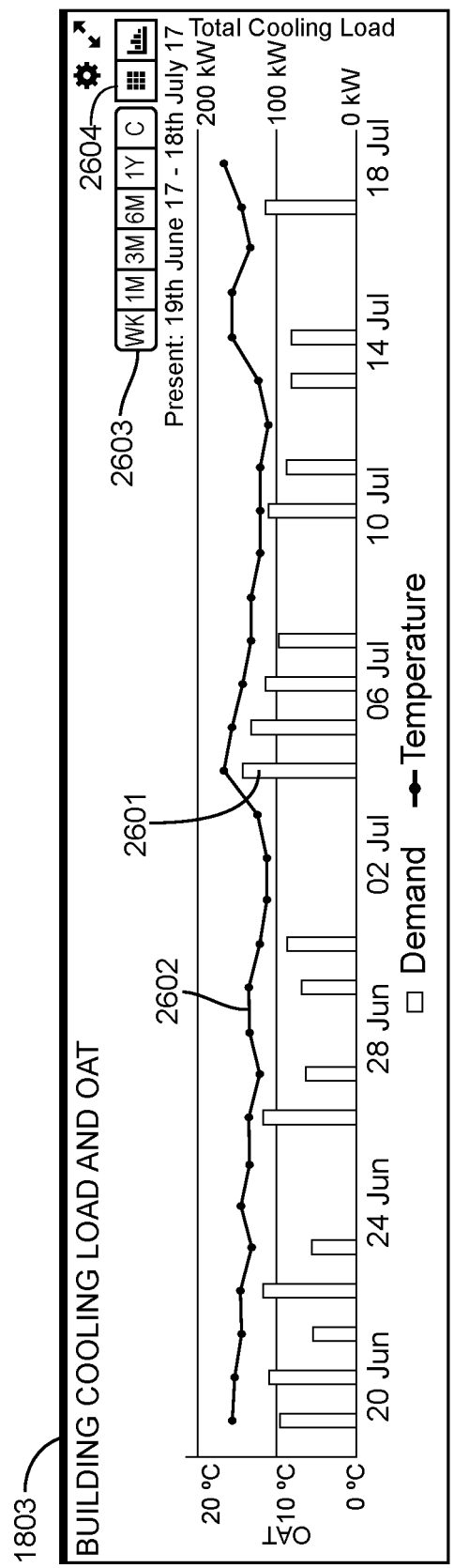
FIG. 26 is a drawing of a building cooling load and outdoor air temperature (OAT) widget which can be included in the plant room dashboard of FIG. 18, according to some embodiments.

Referring now to FIG. 26, the "Building Cooling Load and Outdoor Air Temperature (OAT)" widget 1803 is shown, according to an exemplary embodiment. This widget may display the total cooling load 2601 (e.g., the building load) against outside air temperature 2602 for the selected time resolution. This will help in understanding how the building load varies with changing ambient conditions. Total building load and outside air temperature can be averaged and plotted as per the selected timeline.

A time selection 2603 is available on the upper right corner and can be switched between one week, one month, three months, six months, one year, or any other custom timeline (e.g., yesterday, last 24 hours, last week, last 30 days, last 6 months, or any custom range). A user can view the data in grid format by clicking on the grid toggle 2604.

Figure 27:
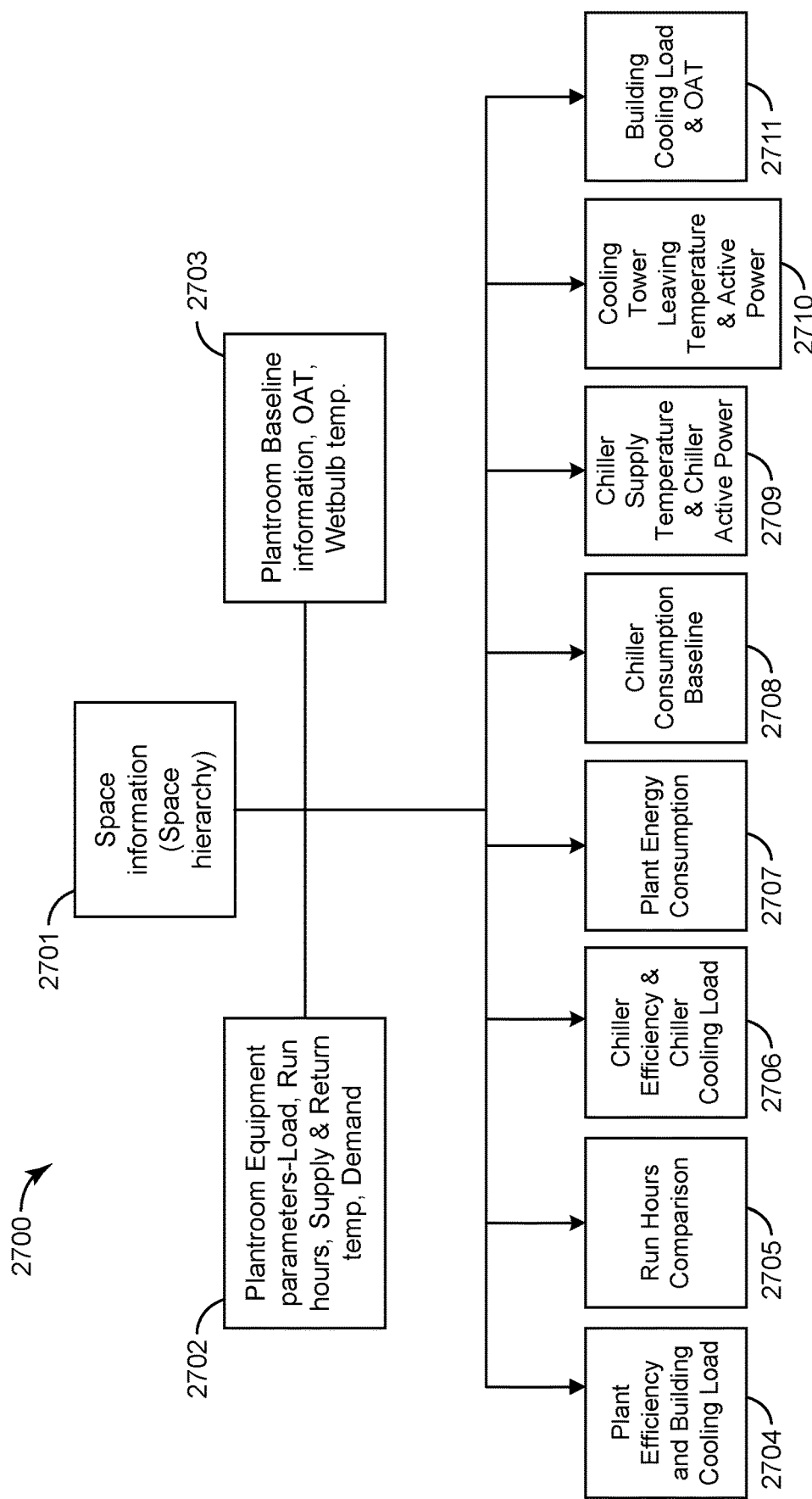
FIG. 27 is a block diagram illustrating the data inputs and information in the plant room dashboard of FIGS. 17-18, according to some embodiments.

Referring now to FIG. 27, a block diagram 2700 illustrating the data used to generate the plant room dashboard is shown, according to an exemplary embodiment. The plant room dashboard may use space information 2701, plant room equipment parameters (e.g., load and run hours), supply and return temperatures, demand 2702, plant room baseline information, outdoor air temperature, and wet bulb temperature 2703 to generate the information shown in the plant room dashboard. This information may include plant efficiency and building cooling load 2704, a run hours comparison 2705, chiller efficiency and chiller cooling load 2706, plant energy consumption 2707, a chiller consumption baseline 2708, chiller supply temperature and chiller active power 2709, cooling tower leaving temperature and active power 2710, and building cooling load and outdoor air temperature 2711.

Fault Visualization with Parent-Child Relationships

Referring now to FIGS. 28-33, several drawings of fault visualization interfaces with parent-child relationships are shown, according to some embodiments. The fault visualization interfaces can be generated by any of the building management systems described with reference to FIGS. 1-5. In some embodiments, the fault visualization interfaces are generated by the building energy management system described in detail in U.S. patent application Ser. No. 15/408,404 filed Jan. 17, 2017.

In fault detection, diagnostics, and visualization systems, visualizations may be based on when the fault has occurred, how long the fault has occurred, and in which equipment the fault has occurred. It may also be important to determine the root cause of faults. The fault visualization interfaces described herein may highlight what's happening upstream (in parent equipment) and/or downstream (in child equipment) to allow the user to easily view the root cause of a fault.

Figure 28:
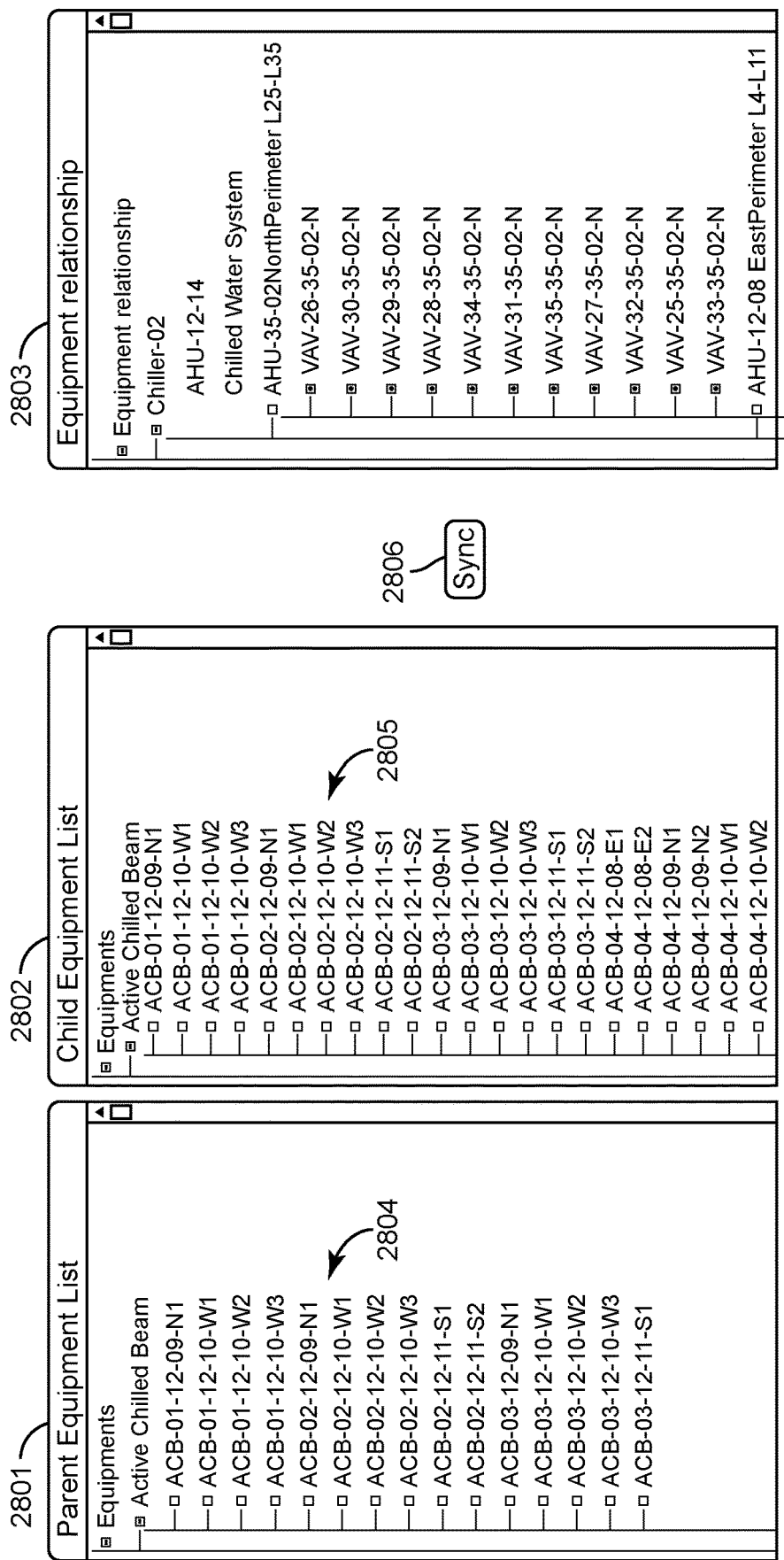
FIG. 28 is a drawing of a user interface defining parent equipment, child equipment, and relationships between the parent equipment and the child equipment, according to some embodiments.

Referring particularly to FIG. 28, the fault visualization interface may indicate parent equipment list 2801 which lists all potential parent equipment, child equipment list 2802 which lists all potential child equipment, and equipment relationship list 2803 which indicates established parent-child relationships. The user may create a parent-child relationship by selecting at least one entry 2804 from parent equipment list 2801 and at least one entry 2805 from child equipment list 2802, and clicking on the sync button 2806. The selected equipment will then appear on equipment relationship list 2803 to indicate a parent-child relationship between the selected equipment entries 2804, 2805. The definition of a parent-child relationship may vary and may be unique to each space (e.g., building, facility, location, floor, wings, room, etc.). This can be defined under the application settings.

Figure 29:
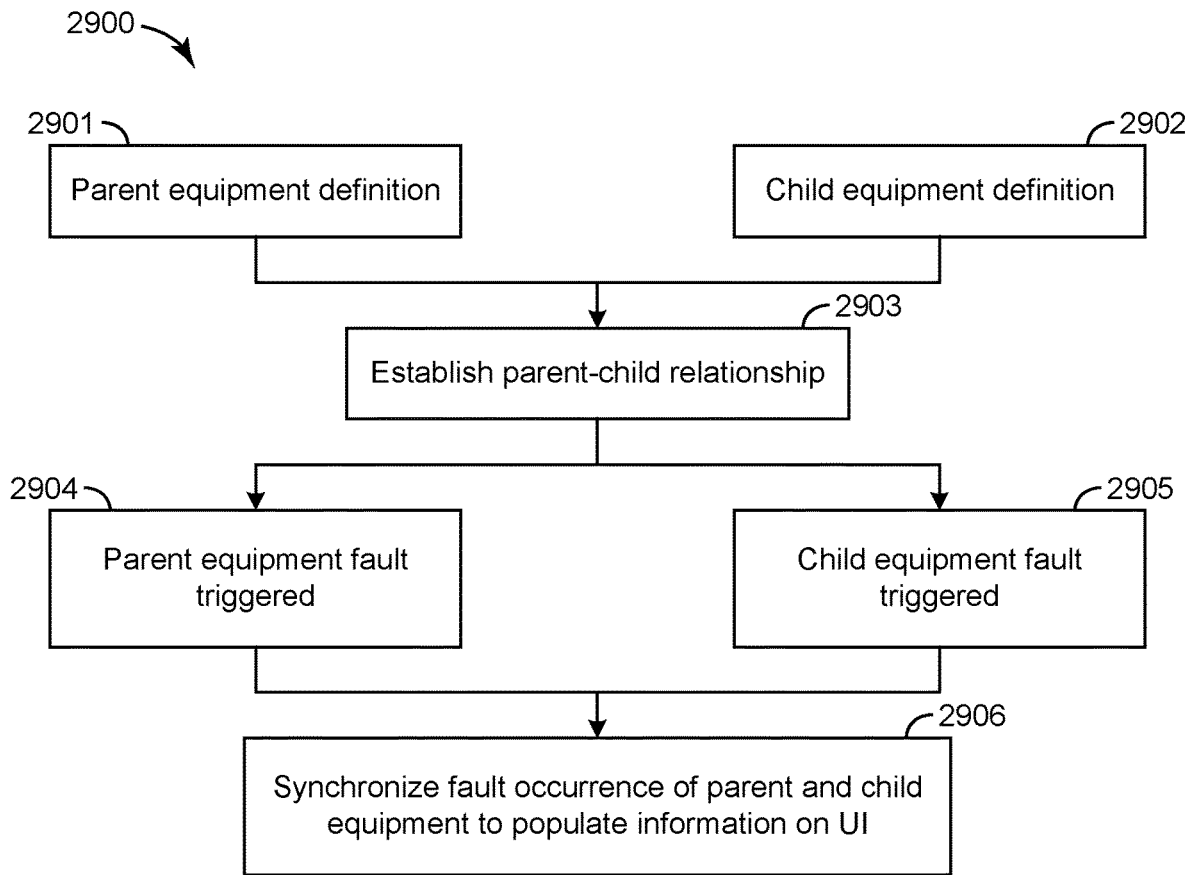
FIG. 29 is a flowchart of a process for establishing parent-child relationships between equipment and using the parent-child relationships to synchronize fault occurrences, according to some embodiments.

Referring now to FIG. 29, a flow diagram 2900 illustrating a technique for generating fault visualization interfaces with parent-child relationships is shown, according to an exemplary embodiment. The fault visualization system may receive a parent equipment definition 2901 and a child equipment definition 2902. Several examples of equipment definitions which can be used by the fault visualization system are described in detail in U.S. Pat. No. 9,703,276 issued Jul. 11, 2017, the entire disclosure of which is incorporated by reference herein. The parent and child equipment definitions can be used to establish parent-child relationships (step 2903). When either a parent equipment fault is triggered (step 2904) or a child equipment fault is triggered (step 2905), the fault occurrence can be synchronized to populate information in the fault visualization interface (step 2906).

Figure 30:
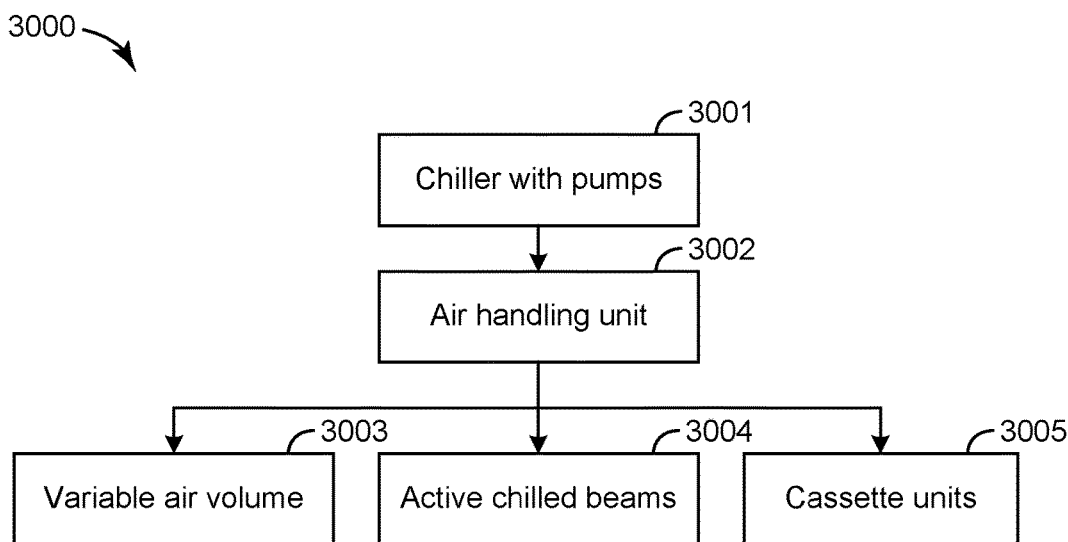
FIG. 30 is a block diagram illustrating a set of parent-child relationships between HVAC equipment, according to some embodiments.

Referring now to FIG. 30, an example of parent-child relationships between equipment is shown, according to an exemplary embodiment. A chiller with pumps 3001 may provide chilled fluid to an air handling unit 3002. A parent-child relationship can be defined between the chiller 3001 and the air handling unit 3002 which identifies the chiller 3001 as the parent equipment and the air handling unit 3002 as the child equipment. The air handling unit 3002 may provide chilled air to a variable air volume unit 3003, to active chilled beams 3004, and/or to cassette units 3005. A parent-child relationship can be defined between the air handling 3002 and the variable air volume unit 3003, active chilled beams 3004, and cassette units 3005. The parent-child relationship may identify the air handling unit 3002 as the parent equipment and the variable air volume unit 3003, active chilled beams 3004, and the cassette units 3005 as the child equipment.

Figure 33:
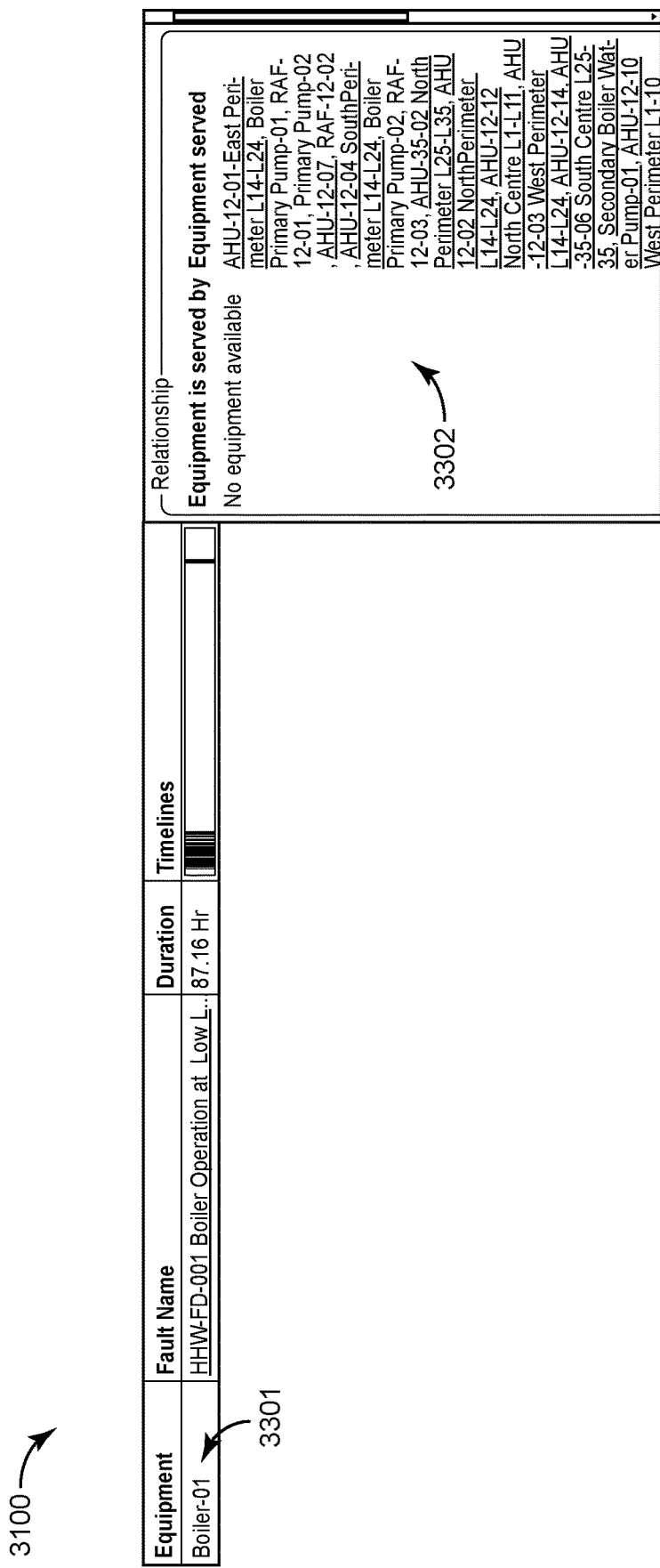
FIG. 33 is a drawing of another fault visualization interface for a boiler showing a set of equipment served by the boiler and indicating faults in the served equipment, according to some embodiments.

Referring now to FIGS. 31-33, drawings illustrating a fault visualization interface 3100 with parent-child relationships are shown, according to an exemplary embodiment. FIG. 31 shows a fault 3101 in an air handling unit which indicates a low supply air temperature in heating mode. The diagnostics 3102 indicate that the fault is occurring because a heating valve is stuck in a closed position. In FIG. 32, the fault visualization interface 3100 also indicates that there is a boiler fault 3201. The boiler may be indicated as a parent equipment of the air handling unit.

This helps the user to understand that even though valve is stuck, the boiler may not be providing the sufficient heating. When the boiler fault is clicked, the fault visualization interface may indicate that the delta temperature is low. For example, FIG. 33 shows a fault 3301 in the boiler along with all of the child equipment served by the boiler. The child equipment experiencing faults 3302 may be highlighted. (e.g., shown in red). It is apparent from FIG. 33 that the fault in the boiler is causing faults in the affected child equipment. This indicates that the air handling unit is not able to provide heating to the rooms because the boiler is not supplying sufficiently hot water to the air handling unit.

Advantageously, the fault visualization interface allows a user to easily identify the root cause of a fault, instead of requiring the user to search for faults across the equipment. The visual indication is a clear indicator for the user to focus & resolve the fault.

Global Rule Library with Crowdsourcing Framework

Referring now to FIGS. 34-41, several drawings illustrating a global rule library with crowdsourcing framework are shown, according to some embodiments. The global rule library with crowdsourcing framework can be implemented in any of the building management systems described with reference to FIGS. 1-5. In some embodiments, the global rule library with crowdsourcing framework is implemented in the building energy management system described in detail in U.S. patent application Ser. No. 15/408,404 filed Jan. 17, 2017.

Building enterprise management solutions (BEMS) typically involves monitoring and identifying optimization opportunities to improve the overall building performance and achieve energy savings. One component of any such enterprise analytics platforms is fault detection and diagnostics (FDD). Some analytics platforms perform FDD using rule based fault detection. The rule may be a mathematical expression which correlates various parameters within the boundaries of an equation and drives outputs (i.e., faults) when the boundaries are violated.

Some FDD products are based on a standard library of rules which gets deployed when the FDD product is installed on site. However, this fixed library may not be sufficient to cover varying requirements around the globe. For example, situations may arise in which a majority of the rules within the library are not applicable to a building because either the library does not encompass the equipment types within the building or the existing equipment do not have the required process point to trigger those rules.

This results in two situations. From the customer's perspective, the investment in the FDD product is not fully utilized as most of the available rules cannot be put to use or further investment needs to be made on the instrumentation infrastructure just to utilize the benefits of the FDD product for which they have already borne the cost. From the FDD provider's perspective, it becomes increasingly difficult to maintain different versions of rules to suit each customer's requirement. Due to the complexity of defining rules, customers may not be allowed to define rules, which increases the burden on the FDD provider.

The systems and methods described herein use a permission-based rule editor for customers to define rules using a user friendly editor as well as crowdsourcing the approved rules to be a part of a global rule library for the FDD product. The concept around such a framework may follow a permission-based hierarchy which would enable a customer to define his own rules. Once approved, the rules can be made available to other customers subscribed to the services of the product, thereby expanding the standard rule library so that it can automatically encompass more scenarios. The framework ensures a healthy collaboration between customers and product organization as both can work together to improve the capabilities of the FDD system.

A customer can subscribe to services of an enterprise analytics software and accept the terms and conditions of participating in the crowdsourcing program. When the customer feels that he needs more rules to suffice his requirements around measuring equipment and energy performance, the customer can define his own rules which will be tagged to the category of internal rule. A team of experts from the FDD product organization may be notified of the new rule and they can validate the authenticity of such a rule and approve it. Approved rules may be immediately applicable to the specific customer only and may also be automatically tagged to the global library so that they can be used by other customers based upon their choice to do so. Accordingly, this will not only ensure customer participation and appreciating the software capability but will establish an ever increasing global library which can encompass more scenarios with time.

Figure 34:
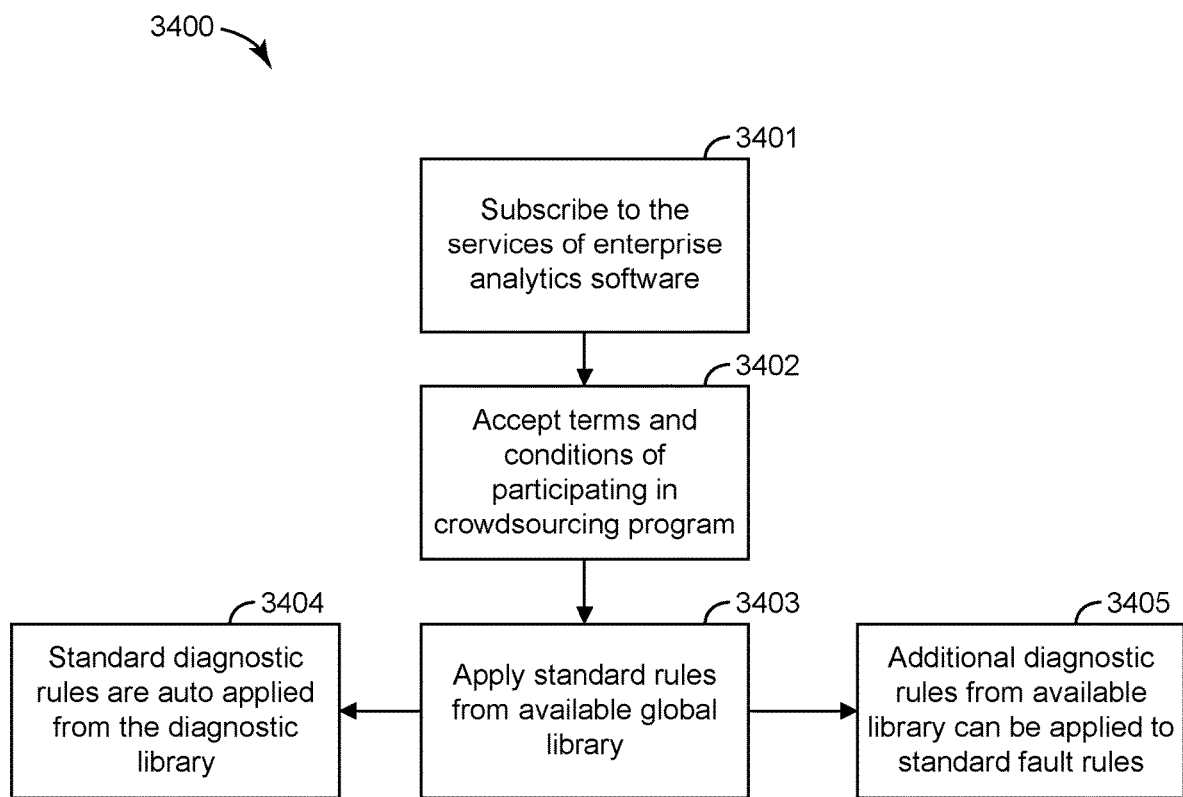
FIG. 34 is a flowchart of a process for applying standard fault rules and diagnostic rules from a global library, according to some embodiments.

Referring particularly to FIG. 34, a flowchart 3400 of a process for generating and applying standard rules in a FDD system is shown, according to an exemplary embodiment. A customer can subscribe to services of an enterprise analytics software (step 3401) and accept the terms and conditions of participating in the crowdsourcing program (step 3402). This is to keep the confidentiality of a customer's rule intact. As discussed above, a rule is a mathematical expression which is governed within the boundaries of an equation. Two such categories of rules will be available: (1) rules to identify faults and (2) rules for identifying the diagnostics (e.g., for arriving at root cause analysis for the triggered faults).

For a new subscriber to the services of enterprise analytics software, a global (standard) rule library both for faults and diagnostics may be made available and applied (step 3403). The customer can choose which rules he wants to run for applicable equipment groups. The customer-selected fault rules may come with pre-mapped diagnostic rules, which may be auto applied from the diagnostic library (step 3104). Upon application, these set of rules may automatically start executing on the process points and return valuable insights in terms of equipment performance. The customer may also chose to apply additional diagnostic rules from the available library to the customer-selected fault rules (step 3405).

Any rule which is a part of the global library falls under the category of external rules. All rules may be supported by an appropriate description which states what the intended purpose of the rule and what problem it seeks to identify. This becomes helpful for customers to understand which rules are applicable for their site and use them accordingly.

Any external rule equation may not be displayed to any customer except for the customer who has contributed to the external rule as a part of the framework (described in greater detail below) to maintain confidentiality.

Figure 36:
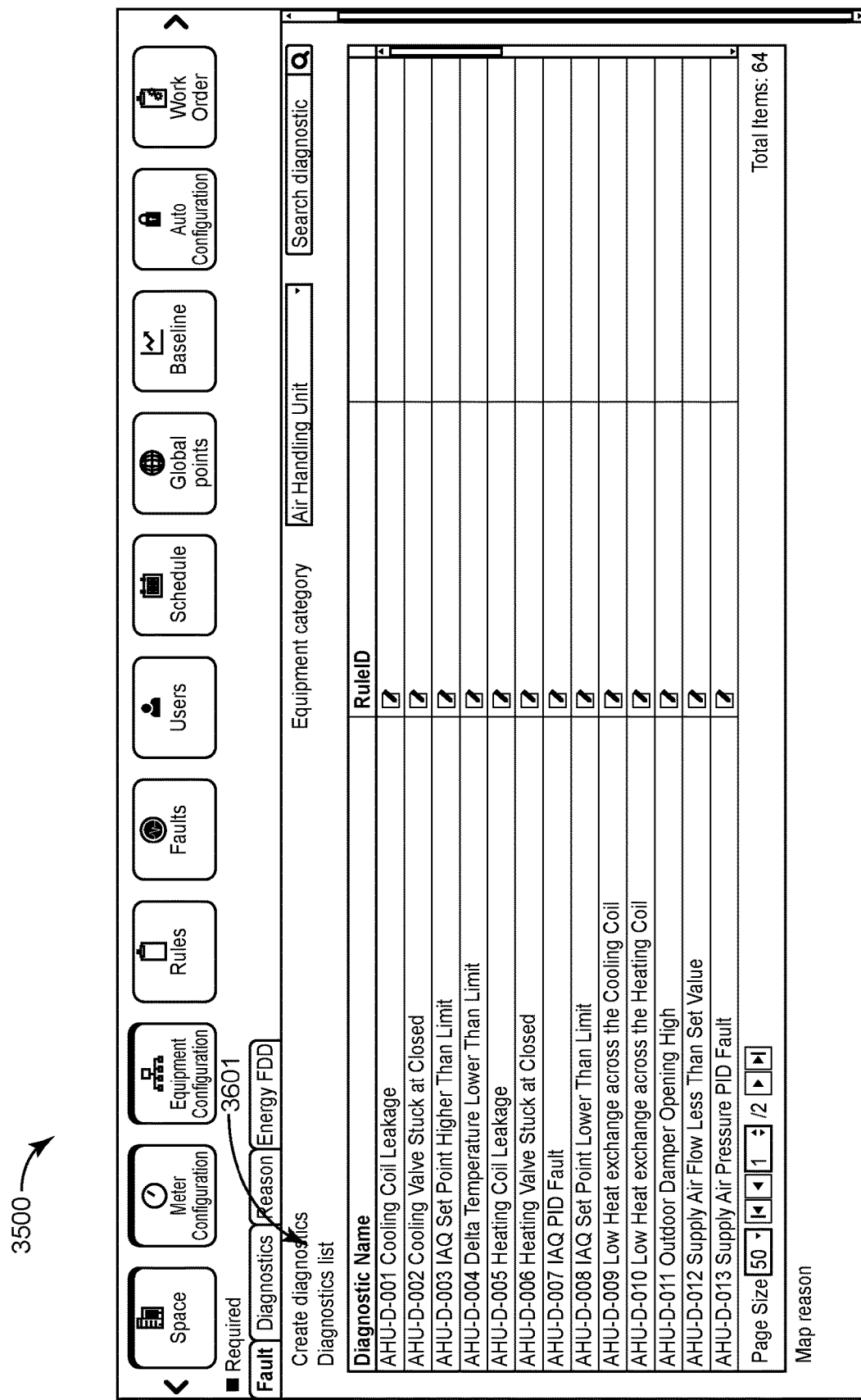
FIG. 36 is a drawing of a user interface listing a set of global diagnostic rules, according to some embodiments.

Referring now to FIGS. 35-36, a user interface 3500 illustrating a set of standard fault rules 3501 and diagnostic rules 3601 is shown, according to an exemplary embodiment. The customer can choose which rules from the standard library of fault rules 3501 he wants to apply across his equipment sets as applicable. The set of fault rules 3501 is shown in FIG. 35. Relevant diagnostic rules 3601 are already linked to the fault rules 3501 and become automatically applicable once a fault rule is applied. Diagnostic rules 3601 can be automatically applied based on the main fault rules 3501 which are activated in a particular site. A set of diagnostic rules 3601 is shown in FIG. 36. In some embodiments, the customer is provided with the ability to map other diagnostics from the available library to existing fault rules.

Referring now to FIGS. 37-40, a user interface illustrating an editor 3700 for defining custom fault rules and custom diagnostic rules is shown, according to an exemplary embodiment. Any rule which has been defined by the customer and is not a part of the global rule library falls under the category of an internal rule. Internal rules may be subject to an approval process before they become applicable to prevent customers from implementing bad rules. A user-friendly rule editor can be used to define both fault rules and diagnostic rules which can later be mapped to newly created fault rules or existing rules within the available library.

Figure 37:
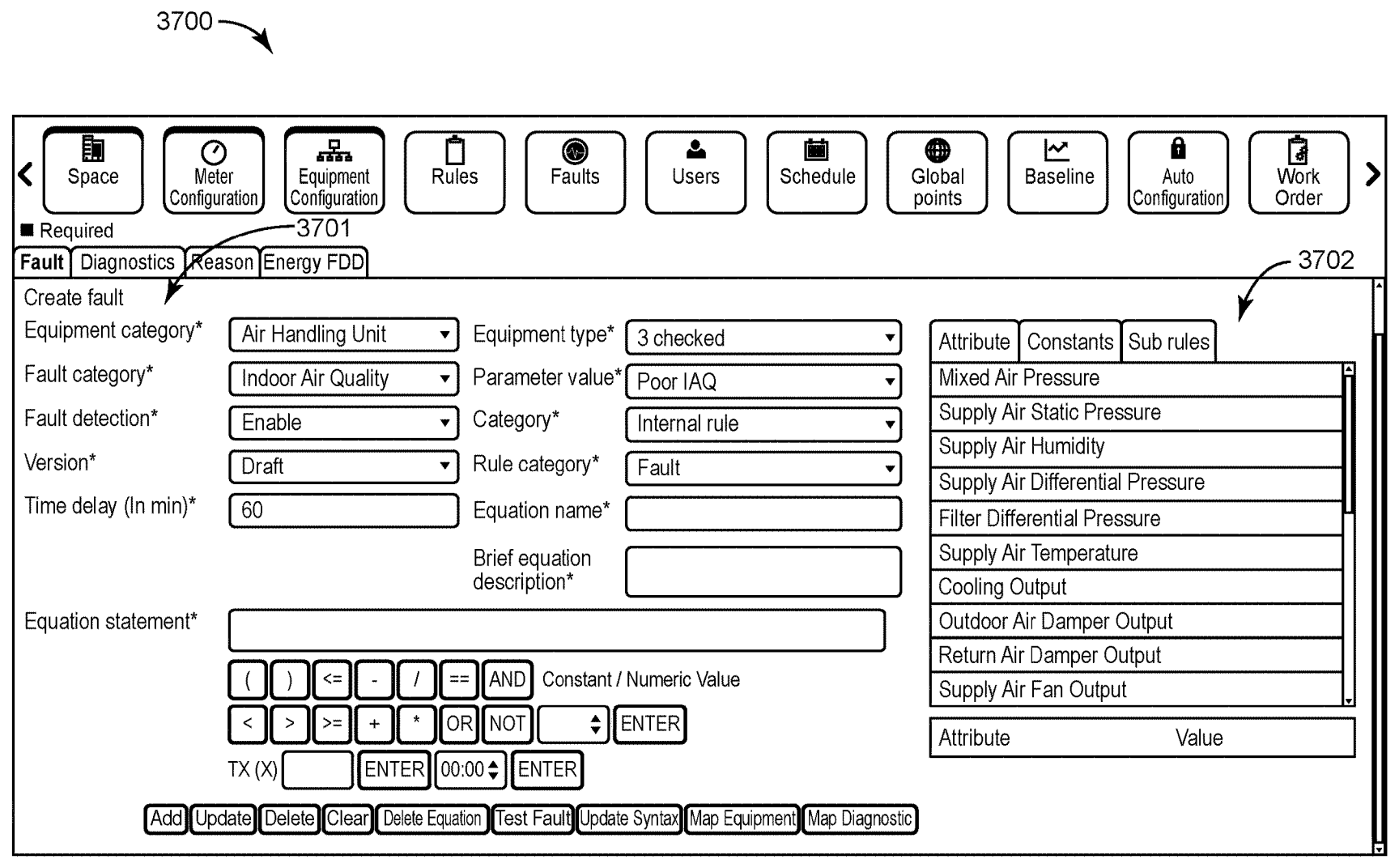
Figure 38:
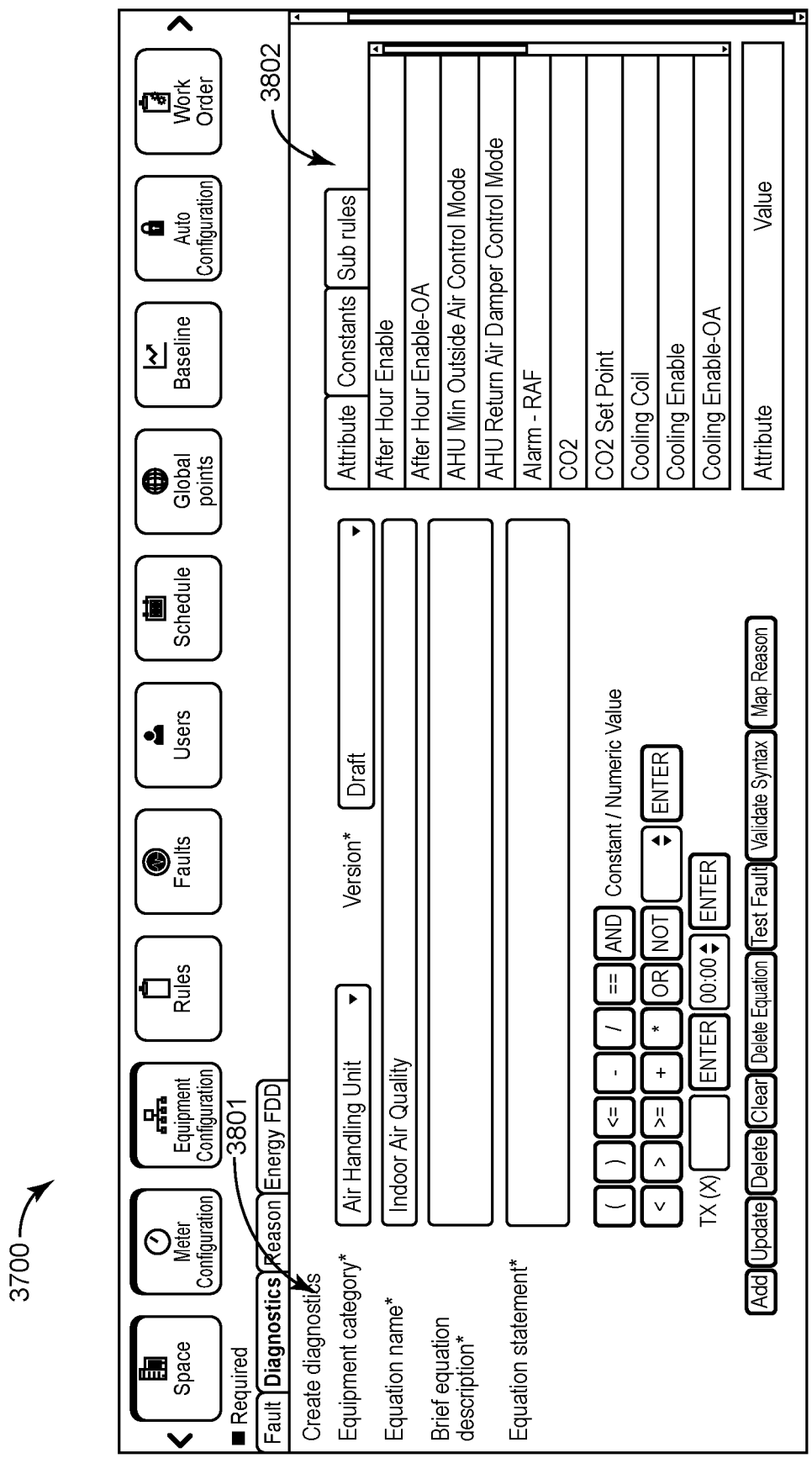
FIG. 38 is a drawing of a rule editor which can be used to define a custom diagnostic rule, according to some embodiments.
Figures 39, 40:
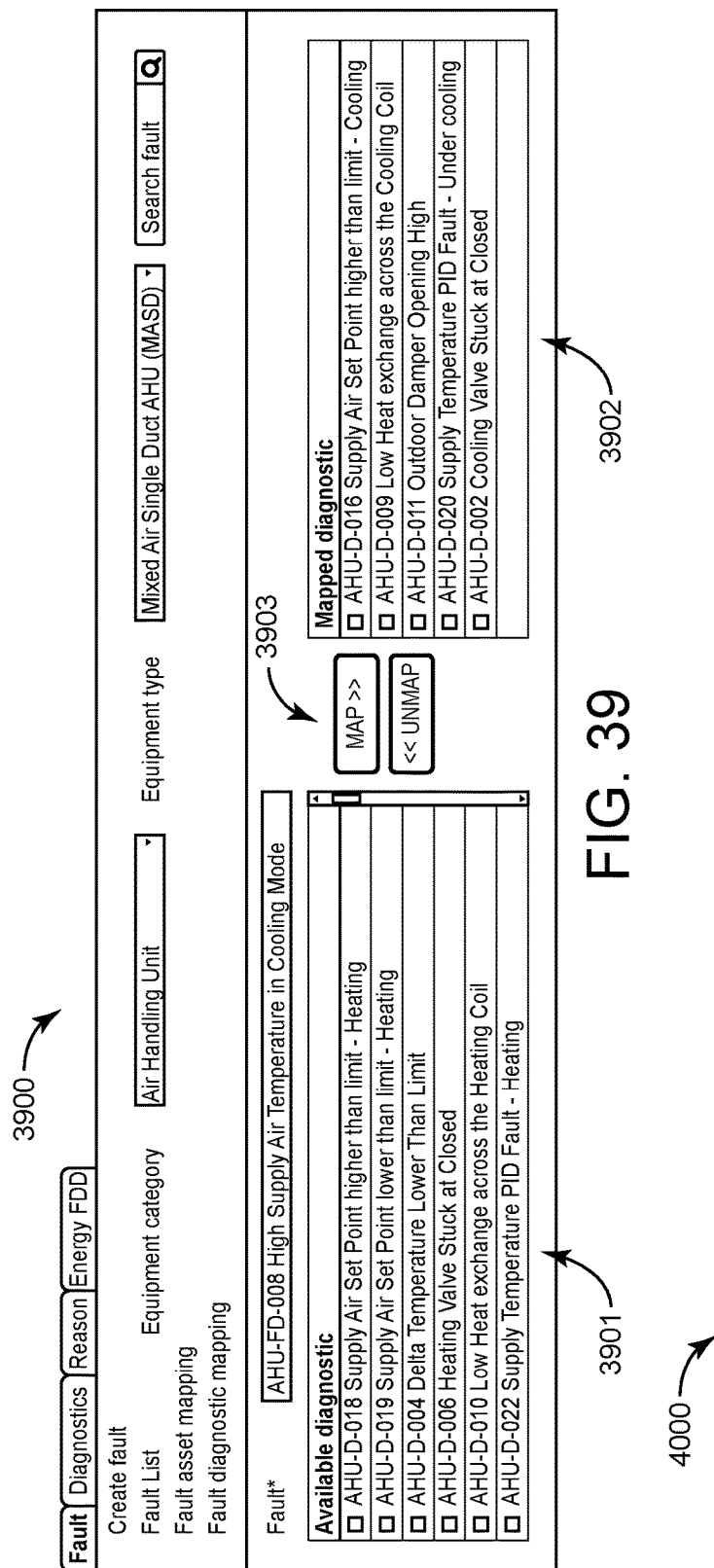
FIG. 39 is a drawing of a user interface for mapping newly-created diagnostic rules to existing global fault rules or internal fault rules, according to some embodiments.
FIG. 40 is a drawing of a user interface which allows a customer to define various conditions and thresholds which may be part of a custom rule, according to some embodiments.

FIG. 37 shows the rule editor 3700 being used to define a custom fault rule. Using this editor by selecting fault tab 3701, a customer can define his own fault rule from the available list of process points 3702. FIG. 38 shows the rule editor 3700 being used to define a custom diagnostic rule by selecting the diagnostics tab 3801. Using this editor a customer can define his own diagnostic rule from the available list of process points 3802. By default, customer-defined fault rules and diagnostic rules may be classified as internal rules. FIG. 39 illustrates a user interface 3900 for mapping newly-created diagnostic rules 3901 to existing global fault rules or internal fault rules 3902 using the map button 3903. FIG. 40 illustrates a user interface 4000 which allows a customer to define various conditions and thresholds which may be part of a rule.

Figure 41:
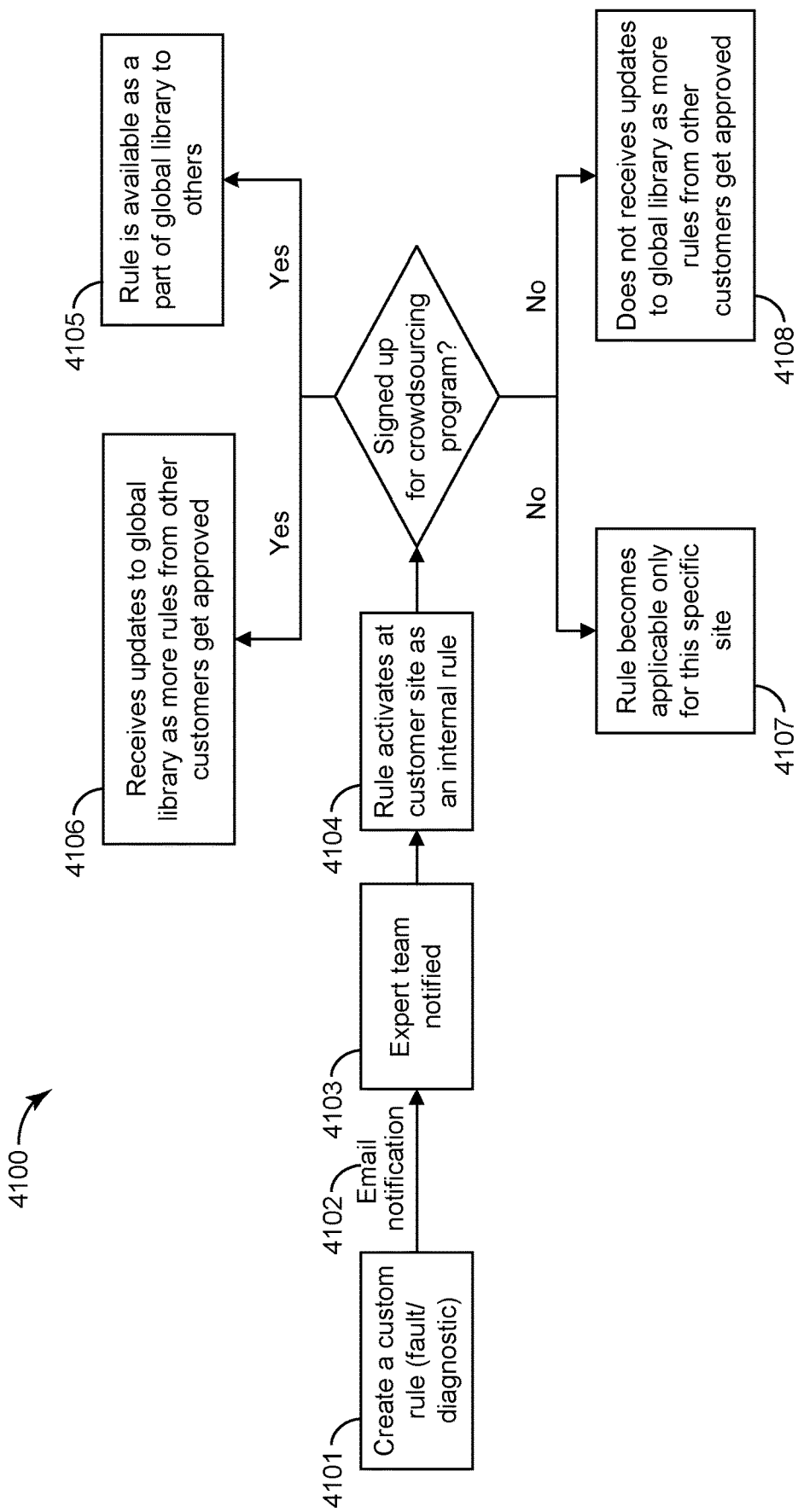
FIG. 41 is a flowchart of a rule curating process, according to some embodiments.

Referring now to FIG. 41, a flow chart 4100 of a rule curating process is shown, according to an exemplary embodiment. The following paragraphs describe the curating process under two scenarios: (1) the customer is signed up for the crowdsourcing program and (2) the customer is not signed up for the crowdsourcing program.

In the first scenario (i.e., the customer is signed up for the crowdsourcing program), when a custom fault/diagnostic rule is defined and saved (step 4101), an auto generated email notification 4102 may be sent to the organization that created the FDD product (e.g., Johnson Controls). The notification may be sent to a team of subject matter experts (SMEs) within the organization (step 4103). The SME team may validate the rule using the test fault feature, which ensures that the rule is supported in the existing framework and would return appropriate results.

Once the rule has been approved, the rule may activate specifically for the customer who defined it (step 4104). The rule may also become a part of the global rule library and may be added to the external rule list for all other customers who are subscribed to the services of the enterprise analytics software (step 4105). In some embodiments, the rule equation can only be viewed by the enterprise software provider and the customer who has defined it to maintain confidentiality of individual customer information. Since each rule is also supported by a description, it will be easy for other customers who benefit from this crowdsourcing mechanism to understand if the rule is applicable for their site and use it accordingly. The customer who contributed in defining this custom rule can view and edit the equation.

Once edited, the rule may be subject to the same approval process. However, this time the SME team may choose to save it as a new rule in the existing global rule library if there are deviations in output or overwrite the old rule as it may suggest enhancement in detection. A customer who is signed up for the crowdsourcing program may have the benefits of receiving updates to the global rule library as a part of other customers contributing to the library through their respective custom rule section (step 4106).

In the second scenario (i.e., the customer is not signed up for the crowdsourcing program), when a custom fault/diagnostic rule is defined and saved (step 4101), an auto generated email notification 4102 may be sent to the SME team (step 4103). The SME team may validate the rule using the test fault feature which ensures that the rule is supported in the existing framework and would return appropriate results.

Once the rule has been approved, the rule may activate specifically for the customer who defined it (step 4104). However, the rule does not become a part of the global rule library as the customer has chosen to keep it confidential by not participating in the program. The rule equation can only be viewed by the enterprise software provider and the customer who has defined it to maintain confidentiality of individual customer information (step 4107). The customer who has contributed in defining this custom rule can view and edit the equation Once edited, the rule may be subject to the same approval process. The rule (fault/diagnostic) will only be applicable to the specific customer site. A customer who is not signed up for the crowdsourcing program may not have the benefits of receiving updates to the global rule library as a part of other customers contributing to the library through their respective custom rule section (step 4108).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
a remote rules server;
a local rules server located at a customer site, the local rules server comprising a standard rules database and a custom rules database, the standard rules database configured to store standard rules and the custom rules database configured to store user-created rules, the local rules server configured to:
    allow a customer to create a new user-created rule; and
    send the new user-created rule to the remote rules server;
wherein the remote rules server is configured to:
    receive the new user-created rule; and
    provide the new user-created rule to one or more other local rules servers located at one or more other customer sites; and
a user preferences module configured to:
    receive a customer sharing preference indicating a preference of the customer to share or not share user-created rules and, if the customer has indicated a preference to not share user-created rules:
        prevent the remote rules server from sending the user-created rule to the one or more other local rules servers; and
        prevent the local rules server from receiving custom rules created by other customers.

2. The building management system of claim 1, the remote rules server further configured to:
notify a reviewer that the new user-created rule was created;
allow the reviewer to validate the new user-created rule and signal an approval; and authorize activation of the validated new user-created rule in response to the approval.

3. The building management system of claim 1, further comprising a fault detection and diagnostics module configured to apply the standard rules and the custom rules to a building equipment dataset;
wherein the local rules server further comprises an interface generator configured to generate a user interface that allows a user to select which rules from the standard rules database and the custom rules database are applied by the fault detection and diagnostics module.

4. The building management system of claim 3, wherein the rules comprise fault rules and diagnostic rules, and wherein the user interface is further configured to allow the user to map the diagnostic rules to the fault rules.

5. The building management system of claim 3, wherein each rule comprises a rule description and a rule equation; and
wherein the user interface is configured to display the rule description for each rule and hide the rule equation for user-created rules created by a different customer.

6. The building management system of claim 1, wherein the local rules server is further configured to allow a user to edit a user-created rule and send the edited user-created rule to the remote rules server;
wherein the remote rules server is further configured to:
receive the edited user-created rule;
notify a reviewer that the edited user-created rule was edited;
allow the reviewer to validate the edited user-created rule; and
send the edited user-created rule to the one or more other local rules servers.

7. A method for managing a building comprising:
storing standard rules in a standard rules database and user-created rules in a custom rules database, the standard rules database and the custom rules database located in a local rules server;
allowing a customer to create a new user-created rule;
sending the new user-created rule to a remote rules server;
receiving the new user-created rule at the remote rules server;
providing the new user-created rule from the remote rules server to one or more other local rules servers located at one or more other customer sites;
notifying a reviewer that the new user-created rule was created;
allowing the reviewer to validate the new user-created rule and provide an approval to the remote rules server;
activating the new user-created rule in response to the approval; and
receiving a customer sharing preference indicating preference of the customer to share or not share user-created rules; and, if the customer has indicated a preference to not share user-created rules:
preventing the remote rules server from sending the user-created rule to the one or more other local rules servers; and
preventing the local rules server from receiving custom rules created by other customers.

8. The method of claim 7, editing user-created rules at the local rules server and sending the edited user-created rule to the remote rules server; receiving the edited user-created rule at the remote rules server; notifying a reviewer that the edited user-created rule was edited; allowing the reviewer to validate the edited user-created rule; and sending the edited user-created rule from the remote rules server to the one or more additional local rules servers.

9. The method of claim 7, further comprising generating a user interface that allows a user to select which rules from the standard rules database and the custom rules database are applied by a fault detection and diagnostics module.

10. The method of claim 9, wherein the rules comprise fault rules and diagnostic rules, and wherein the user interface allows the user to map the diagnostic rules to the fault rules.

11. The method of claim 9, wherein each rule comprises a rule description and a rule equation; and
wherein the user interface displays the rule description for each rule and hides the rule equation for user-created rules created by a different customer.

12. A building management system comprising:
a global rules database;
a plurality of local rules servers in communication with the global rules database, each local rules server configured to:
allow a user to create a user-created rule;
send the user-created rule to a reviewer for validation;
receive confirmation of rule validation; and
upload the validated user-created rule to the global rules database; and
a user preferences module configured to:
receive a customer sharing preference indicating a preference of the customer to share or not share user-created rules and, if the customer has indicated a preference to not share user-created rules:
prevent the remote rules server from sending the user-created rule to the one or more other local rules servers; and
prevent the local rules server from receiving custom rules created by other customers.

13. The building management system of claim 12, wherein the global rules database comprises a standard rules database storing standard rules and a custom rules library storing user-created rules;
wherein each local rules server is further configured to:
access the standard rules database and the custom rules database to provide a list of standard rules and a list of user-created rules on a user interface,
wherein the user interface is configured to allow a user to select rules from the list of standard rules and the list of user-created rules to be applied to a building equipment dataset.

14. The building management system of claim 12, further comprising a user preferences module configured to:
provide the terms of conditions of the building management system; and
provide an option to opt-in or opt-out of sharing user-created rules.

15. The building management system of claim 13, wherein each rule comprises a rule description and a rule equation; and
wherein the user interface is configured to display the rule description for each rule and hide the rule equation for user-created rules created by a different customer.

16. The building management system of claim 15, wherein the rules comprise fault rules and diagnostic rules, and wherein the user interface is further configured to allow the user to map the diagnostic rules to the fault rules.

17. The building management system of claim 12, wherein each local rules server is further configured to:

allow a user to edit a user-created rule created using the local rules server;

send the edited user-created rule to a reviewer for validation;

receive a confirmation of rule validation; and send the edited user-created rule to the global rules database;

wherein the global rule library is further configured to replace the user-created rule with the edited user-created rule in the custom rules database.

* * * * *